(12) United States Patent
Kang et al.

(10) Patent No.: US 11,971,604 B2
(45) Date of Patent: Apr. 30, 2024

(54) CAMERA MODULE AND ELECTRONIC DEVICE INCLUDING THE SAME

(71) Applicant: SAMSUNG ELECTRONICS CO., LTD., Suwon-si (KR)

(72) Inventors: Hyunjin Kang, Seoul (KR); Seunghak Lee, Hwaseong-si (KR); Insang Song, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 17/317,464

(22) Filed: May 11, 2021

(65) Prior Publication Data
US 2022/0091363 A1 Mar. 24, 2022

(30) Foreign Application Priority Data
Sep. 23, 2020 (KR) .......................... 10-2020-0123321

(51) Int. Cl.
H04N 23/55 (2023.01)
G02B 7/10 (2021.01)
G02B 13/00 (2006.01)

(52) U.S. Cl.
CPC ........... *G02B 7/102* (2013.01); *G02B 13/009* (2013.01); *H04N 23/55* (2023.01)

(58) Field of Classification Search
CPC ...... G02B 7/102; G02B 13/009; H04N 23/55; H04N 23/57; H04N 23/51; H04N 23/50; H04N 23/54; G03B 17/12; H04M 1/0264
See application file for complete search history.

(56) References Cited

U.S. PATENT DOCUMENTS

| 5,144,493 | A | 9/1992 | Nomura |
| 7,440,201 | B2 | 10/2008 | Tsuruta et al. |
| 9,684,184 | B2 | 6/2017 | Miller et al. |
| 2017/0115467 | A1* | 4/2017 | Tanaka ................. G02B 15/143 |
| 2017/0374248 | A1* | 12/2017 | Eromaki ................ H04N 23/54 |
| 2019/0104239 | A1 | 4/2019 | Aschwanden et al. |
| 2022/0004085 | A1* | 1/2022 | Shabtay ................. G03B 17/12 |

FOREIGN PATENT DOCUMENTS

| KR | 1991-0001442 A | 1/1991 |
| KR | 10-0761630 B1 | 9/2007 |
| KR | 10-1902052 B1 | 9/2018 |
| KR | 10-2018-0118720 A | 10/2018 |
| KR | 10-2019-0059896 A | 5/2019 |
| KR | 10-2019-0134017 A | 12/2019 |

* cited by examiner

*Primary Examiner* — Mekonnen D Dagnew
(74) *Attorney, Agent, or Firm* — Sughrue Mion, PLLC

(57) ABSTRACT

Provided is a camera module including a housing having an opening, and a first lens assembly configured to move in the housing between a first position in which the first lens assembly is entirely provided in the housing, and a second position in which a portion of the first lens assembly protrudes external to the housing through the opening of the housing, a portion of the first lens assembly being attached to the housing by a magnetic force at the second position.

12 Claims, 17 Drawing Sheets

CAMERA MODULE AND ELECTRONIC DEVICE INCLUDING THE SAME

CROSS-REFERENCE TO RELATED APPLICATION

This application is based on and claims priority under 35 U.S.C. § 119 to Korean Patent Application No. 10-2020-0123321, filed on Sep. 23, 2020, in the Korean Intellectual Property Office, the disclosure of which is incorporated by reference herein in its entirety.

BACKGROUND

The present disclosure relates to a camera module and an electronic device including the same.

As functions of cameras included in electronic devices such as smartphones increase, camera modules including image sensors are mounted on the electronic devices. To improve the quality of images captured by camera modules, techniques for reducing the influences of external impact on the camera modules are required. Also, because of the miniaturization of electronic devices according to the significant development in electronic fields and user demands, there is a need to decrease the sizes of camera modules of the electronic devices.

SUMMARY

One or more example embodiments provide a camera module and an electronic device including the same.

According to an aspect of an example embodiment, there is provided a camera module including a housing having an opening, and a first lens assembly configured to move in the housing between a first position in which the first lens assembly is entirely provided in the housing, and a second position in which a portion of the first lens assembly protrudes external to the housing through the opening of the housing, a portion of the first lens assembly being attached to the housing by a magnetic force at the second position.

According to another aspect of an example embodiment, there is provided a camera module including a housing having a side wall, an upper wall including an opening, and a first magnet, a first lens assembly provided in the housing and including a second magnet configured to attach to the first magnet, the first lens assembly being configured to move between a first position and a second position, in which a portion of the first lens assembly protrudes to the outside the housing through the opening of the housing at the second position, a second lens assembly provided under the first lens assembly, a cover provided outside the housing, the cover being configured to move relative to the housing and apply a pressing force to the first lens assembly such that the first lens assembly is provided at the first position, and an elastic body configured to elastically support the first lens assembly in a direction from the first position to the second position.

According to yet another aspect of an example embodiment, there is provided an electronic device including a first panel and a second panel facing each other, a main board provided between the first panel and the second panel, an electronic component connected to the main board, and a camera module connected to the main board, wherein the camera module includes a substrate, a housing provided on the substrate and having an opening, an image sensor provided on the substrate and in the housing, a first lens assembly provided on the image sensor and configured to move in the housing between a first position in which the first lens assembly is entirely provided in the housing, and a second position in which a portion of the first lens assembly protrudes external to the housing through the opening of the housing, a second lens assembly provided between the image sensor and the first lens assembly, and a cover provided on the housing and configured to selectively apply a pressing force to the first lens assembly, wherein the housing includes a first magnet, wherein the first lens assembly includes a second magnet, wherein the cover is further configured to apply the pressing force to the first lens assembly to move the first lens assembly to the first position, and wherein the first lens assembly is fixed at the second position by a magnetic force applied between the first magnet and the second magnet when the pressing force is not applied by the cover.

BRIEF DESCRIPTION OF THE DRAWINGS

Example embodiments will be more clearly understood from the following detailed description taken in conjunction with the accompanying drawings in which.

DETAILED DESCRIPTION

Figure 1:
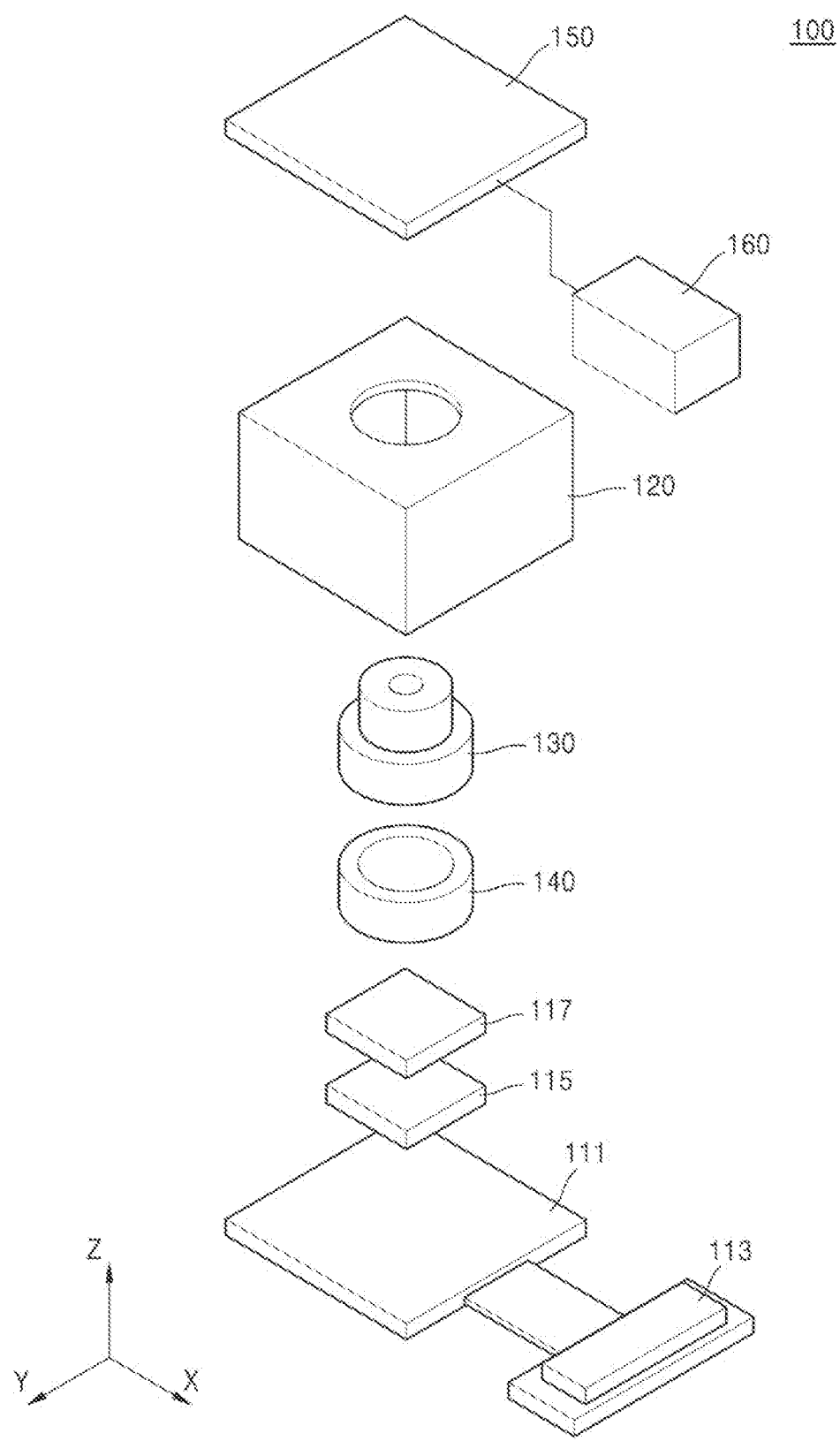
FIG. 1 is an exploded perspective view of a camera module according to an example embodiment.

Hereinafter, example embodiments will be described with reference to the attached drawings. Like reference numerals in the drawings denote like elements, and repeated descriptions thereof will be omitted.

Figure 2A:
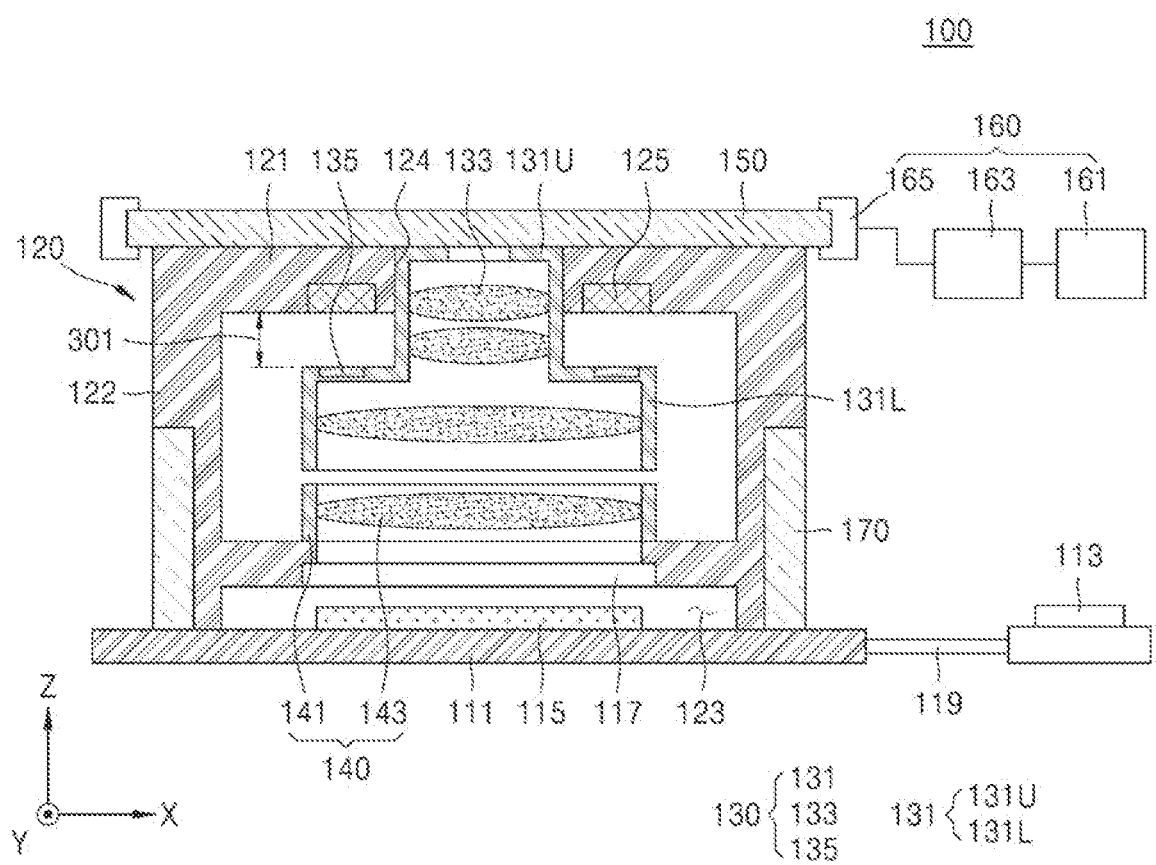
FIGS. 2A and 2B are cross-sectional views of a camera module according to example embodiments.
Figure 2B:
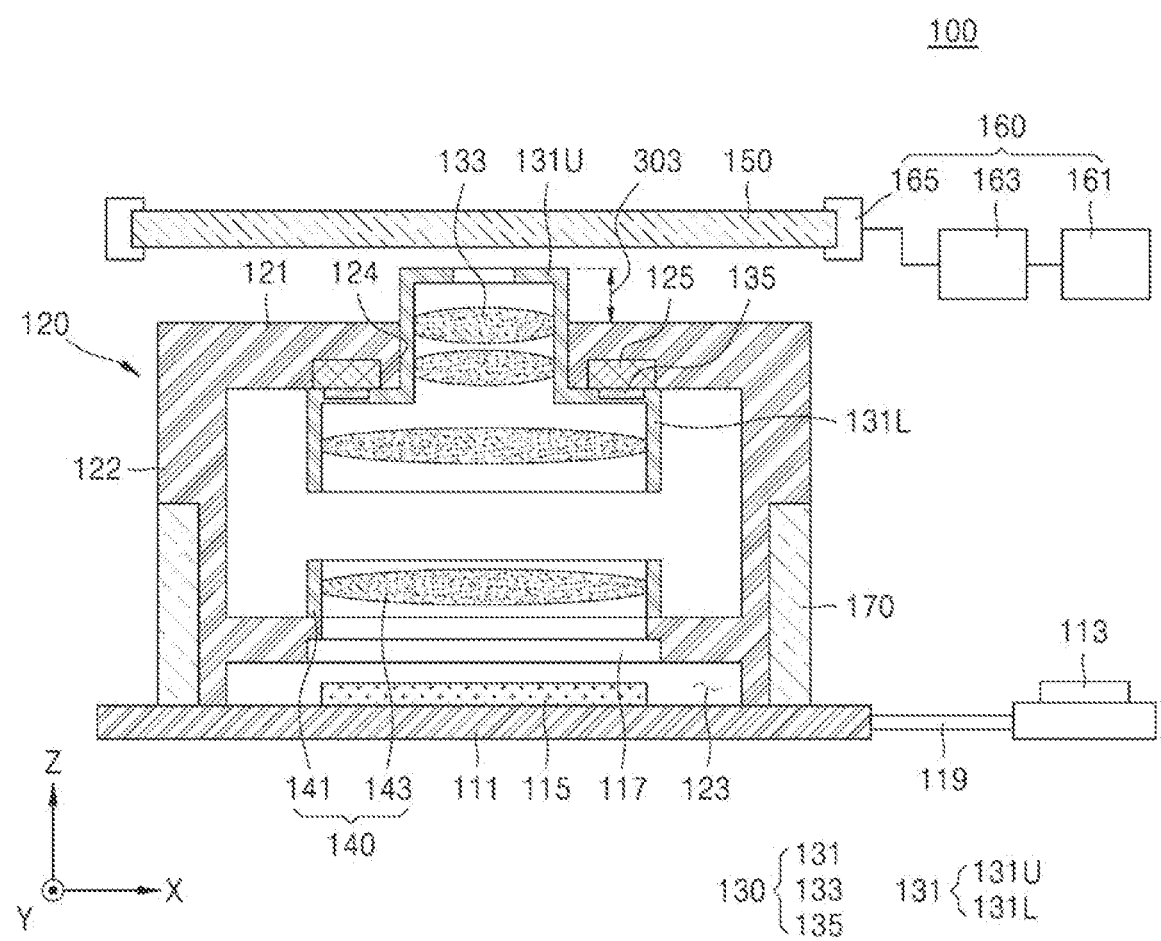

FIG. 1 is an exploded perspective view of a camera module 100, which is a camera assembly, according to an example embodiment. FIGS. 2A and 2B are cross-sectional views of the camera module 100 according to example embodiments.

FIG. 2A illustrates that a first lens assembly 130 of the camera module 100 is at a first position where the first lens assembly 130 is accommodated in a housing 120. FIG. 2B illustrates that the first lens assembly 130 of the camera module 100 is at a second position where a portion of the first lens assembly 130 of the camera module 100 protrudes to the outside the housing 120 in a Z-axis direction.

The camera module 100 according to an example embodiment may be included in an electronic device capturing images or having an optical sensing function. For example, the camera module 100 may be included in an electronic device such as a digital still camera, a digital video camera, a smartphone, a wearable device, an Internet of Things (IoT) device, a tablet, a personal computer (PC), a personal digital assistant (PDA), a portable multimedia player (PMP), or a navigation device. Also, the camera module 100 may be included in an electronic device used as a component of a vehicle, furniture, a manufacturing facility, a door, various measurement devices, or the like.

Referring to FIGS. 1, 2A, and 2B, the camera module 100 may include a substrate 111, a connector 113, the housing 120, an image sensor 115, an optical filter 117, the first lens assembly 130, a second lens assembly 140, a cover 150, and a cover movement mechanism 160.

The substrate 111 may include, for example, a printed circuit board (PCB). The connector 113 may be electrically connected to the substrate 111. For example, the connector 113 may be electrically connected to the substrate 111 through a flexible PCB 119. However, embodiments are not limited thereto. For example, the connector 113 may be directly connected to the substrate 111. The connector 113 may electrically connect the camera module 100 to a main board of an electronic device including the camera module 100. A data signal generated by the camera module 100, power required to operate the camera module 100 (e.g., a driving voltage, a ground voltage, etc.), and the like may be transmitted between the camera module 100 and a device, located outside the camera module 100, through the connector 113.

The housing 120 may be mounted on the substrate 111. The housing 120 may include an accommodation space 123 in which some components forming the camera module 100 may be accommodated. For example, the housing 120 may include side walls 122 on the substrate 111 and an upper wall 121 located on the side walls 122. The upper wall 121 may cover the accommodation space 123 surrounded by the side walls 122. The upper wall 121 of the housing 120 may include an opening 124 vertically penetrating the upper wall 121.

The image sensor 115 may be mounted on the substrate 111. For example, the image sensor 115 may be mounted on the substrate 111 in a wire bonding manner or a flip chip bonding manner. The image sensor 115 may be provided in the accommodation space 123 of the housing 120. The image sensor 115 may receive optical signals collected by the first lens assembly 130 and the second lens assembly 140 and may generate images (or image data) in response to the optical signals. In example embodiments, the image sensor 115 may include a complementary metal oxide semiconductor (CMOS) sensor or a charge coupled device (CCD) sensor.

The optical filter 117 may be provided above the image sensor 115. For example, the optical filter 117 may be supported by the housing 120 and overlap the image sensor 115 in an optical axis direction (e.g., a Z-axis direction). The optical filter 117 may be configured to block a component having a certain wavelength band from incident light. The image sensor 115 may receive an optical component transmitted through the optical filter 117. For example, the optical filter 117 may be an infrared block filter that blocks an infrared component (e.g., an infrared component of light having a wavelength ranging from about 700 nm to about 1150 nm). In some example embodiments, the optical filter 117 may be omitted.

The first lens assembly 130 and the second lens assembly 140 may be provided in the accommodation space 123 of the housing 120. The second lens assembly 140 may be provided above the image sensor 115, and the first lens assembly 130 may be provided above the second lens assembly 140 opposite to the image sensor 115. The first lens assembly 130 and the second lens assembly 140 may be spaced apart from each other along an optical axis.

In example embodiments, the first lens assembly 130 may be a movable lens assembly that is movably mounted in the housing 120. For example, the first lens assembly 130 may be moved between the first position, where the first lens assembly 130 is entirely housed in the housing 120, and the second position, where a portion of the first lens assembly 130 protrudes to the outside of the housing 120 through the opening 124 of the housing 120.

The first lens assembly 130 may include a first lens barrel 131 and at least one lens 133 provided in the first lens barrel 131. The first lens barrel 131 may approximately have a cylindrical shape. For example, when the first lens assembly 130 includes the lenses 133, the lenses 133 may be arranged in the first lens assembly 130 along the optical axis.

The first lens barrel 131 may include a lower portion 131L having a first horizontal width in a direction (e.g., an X-axis direction) perpendicular to the optical axis, and an upper portion 131U having a second horizontal width in the direction (e.g., the X direction) perpendicular to the optical axis. The second horizontal width of the upper portion 131U of the first lens barrel 131 may be less than the first horizontal width of the lower portion 131L of the first lens barrel 131. The lower portion 131L of the first lens barrel 131 may be adjacent to the second lens assembly 140, and the upper portion 131U of the first lens barrel 131 may be inserted into the opening 124 of the housing 120.

The second lens assembly 140 may be a fixed lens assembly having a fixed position in the housing 120. However, embodiments are not limited thereto. For example, the second lens assembly 140 may be movably mounted in the housing 120, similar to the first lens assembly 130.

The second lens assembly 140 may include a second lens barrel 141 and at least one second lens 143 provided in the second lens barrel 141. A shape of the second lens barrel 141 may be approximately a cylinder. For example, when the second lens assembly 140 includes the second lenses 143, the second lenses 143 may be arranged in the second lens barrel 141 along the optical axis.

An actuator 170 may perform a function, for example, auto focusing (AF), optical image stabilizer (OIS), or the like, for image enhancement. The actuator 170 may move the first lens assembly 130 and/or the second lens assembly 140 in a certain direction to perform AF and/or OIS. For example, the actuator 170 may move the first lens barrel 131 on the optical axis and/or an arbitrary plane perpendicular to the optical axis. In example embodiments, the actuator 170 may be mounted on the housing 120. For example, the actuator 170 may include a voice coil motor.

The cover 150 may be disposed outside the housing 120. The cover 150 may be provided on the upper wall 121 of the housing 120 including the opening 124, and may cover the opening 124 of the upper wall 121 of the housing 120. A shape of the cover 150 may be a plate extending approximately in parallel with an outer surface of the upper wall 121 of the housing 120. However, embodiments are not limited thereto. For example, a shape of the cover 150 may be a case surrounding the side walls 122 of the housing 120 to form a space where the housing 120 may be located. The cover 150 may include a transparent material having a high light transmittance. For example, the cover 150 may include glass.

The cover 150 may be moved above the upper wall 121 of the housing 120 in a direction (e.g., the Z-axis direction) perpendicular to the outer surface of the upper wall 121 of the housing 120. By the movement of the cover 150, a distance between the cover 150 and the upper wall 121 of the housing 120 may be adjusted.

The cover movement mechanism 160 may control the movement of the cover 150. For example, the cover movement mechanism 160 may include an actuator 161, a power transmission device 163, and a lifting damper 165 connected to the cover 150. The actuator 161 may include, for example, a motor that generates power for moving the cover 150. The power transmission device 163 may be disposed between the actuator 161 and the lifting damper 165. The power transmission device 163 may adjust a movement speed and a torque of the cover 150. The power transmission device 163 may include, for example, a gear box, a transmission device, and the like. When power is supplied to the lifting damper 165 by the actuator 161 and the power transmission device 163, the cover 150 connected to the lifting damper 165 may lift above the upper wall 121 of the housing 120. The cover 150 may be moved to vary the distance between the cover 150 and the upper wall 121 of the housing 120.

The cover 150 may selectively press the first lens assembly 130. For example, the cover 150 may press the first lens assembly 130 to make the first lens assembly 130 to be provided at the first position or release the pressure on the first lens assembly 130 to move the first lens assembly 130 from the first position to the second position.

In example embodiments, a position change of the first lens assembly 130 may be achieved by an external force applied to the first lens assembly 130 by the cover 150 and a magnetic force applied between the first lens assembly 130 and the housing 120. The magnetic force applied between the first lens assembly 130 and the housing 120 may act in an opposite direction to the external force applied to the first lens assembly 130 by the cover 150.

The housing 120 may include a first magnet 125, and the first lens assembly 130 may include a second magnet 135 having a polarity opposite to that of the first magnet 125. Thus, the magnetic force may be applied between the first lens assembly 130 and the housing 120. The first magnet 125 may be mounted on an inner surface of the upper wall 121 of the housing 120. For example, at least portion of the first magnet 125 may be buried in the upper wall 121 of the housing 120. The second magnet 135 may be mounted on a surface of the first lens assembly 130 that faces the inner surface of the upper wall 121 of the housing 120. For example, the second magnet 135 may be mounted on an upper surface of the lower portion 131L of the first lens barrel 131 that faces the inner surface of the upper wall 121 of the housing 120. For example, at least portion of the second magnet 135 may be buried in the first lens barrel 131.

The first position of the first lens assembly 130 may be a position where the external force applied to the first lens assembly 130 by the cover 150 is balanced with the magnetic force applied between the first magnet 125 and the second magnet 135. For example, the cover movement mechanism 160 may move the cover 150 until the cover 150 contacts the upper wall 121 of the housing 120 to prevent the first lens assembly 130 from protruding from the housing 120. When the cover 150 contacts the upper wall 121 of the housing 120, the magnetic force applied between the first magnet 125 and the second magnet 135 may be balanced with an external force applied downwards to the first lens assembly 130 by the cover 150.

The second position of the first lens assembly 130 may be achieved by the separation of the cover 150 from the first lens assembly 130. For example, when the cover 150 is moved in a direction farther from the upper wall 121 of the housing 120, the first lens assembly 130 may be moved upwards until the lower portion 131L of the first lens barrel 131 contacts the upper wall 121 of the housing 120 by the magnetic force applied between the first magnet 125 and the second magnet 135. At the second position of the first lens assembly 130, the surface of the lower portion 131L of the first lens barrel 131, on which the second magnet 135 is located, may contact the inner surface of the upper wall 121 of the housing 120, and the first magnet 125 and the second magnet 135 may be attached to each other by the magnetic force. The first lens assembly 130 may be detachably attached to the housing 120 at the second position of the first lens assembly 130.

In example embodiments, at least one of the first magnet 125 and the second magnet 135 may be a permanent magnet.

In example embodiments, at least one of the first magnet 125 and the second magnet 135 may be an electromagnet.

In other example embodiments, the first magnet 125 may be a permanent magnet or an electromagnet, and the second magnet 135 may be replaced with a material having a magnetic property, for example, metal.

In other example embodiments, the second magnet 135 may be a permanent magnet or an electromagnet, and the first magnet 125 may be replaced with a material having a magnetic property, for example, metal.

Hereinafter, with reference to FIGS. 2A and 2B, an operation example of the camera module 100 according to example embodiments will be described.

The first lens assembly 130 may be a movable lens assembly of which a position is changed between the first position and the second position, and the second lens assembly 140 may be a fixed lens assembly of which a position is fixed. The first position of the first lens assembly 130 may correspond to a camera standby mode in which a photographing function of the camera module 100 does not work, and the second position of the first lens assembly 130 may correspond to a camera operation mode for using the photographing function of the camera module 100.

When the camera standby mode is switched to the camera operation mode to perform the photographing function of the camera module 100, the first lens assembly 130 may be moved from the first position to the second position. For example, the cover movement mechanism 160 may separate the cover 150 from the first lens assembly 130 by moving the cover 150 upwards. When the external force applied to the first lens assembly 130 is removed by the cover 150, the first lens assembly 130 may be moved upwards by the magnetic force applied between the first magnet 125 and the second magnet 135. While the first lens assembly 130 is moved from the first position to the second position, the movement of the first lens assembly 130 may be guided by the inner surface of the upper wall 121 that defines the opening 124. The lower portion 131L of the first lens barrel 131 may be moved until the lower portion 131L of the first lens barrel 131 contacts the upper wall 121 of the housing 120, and thus the first lens assembly 130 may be provided at the second position. By the magnetic force applied between the first magnet 125 and the second magnet 135, the first lens assembly 130 may be fixed at the second position. At the second position, the first lens assembly 130 and the second lens assembly 140 may be spaced apart from each other by a distance appropriate to perform the photographing function.

Also, when the camera operation mode is switched to the camera standby mode, the first lens assembly 130 may be moved from the second position to the first position. For example, the cover movement mechanism 160 may press the first lens assembly 130 downwards by moving the cover 150 downwards. When the cover 150 is moved until the cover 150 contacts the upper wall 121 of the housing 120, the external force, which is applied to the first lens assembly 130 by the cover 150, may be balanced with a magnetic force applied between the first lens assembly 130 and the housing 120, and thus, the first lens assembly 130 may be provided at the first position.

In example embodiments, while the position of the first lens assembly 130 is changed between the first position and the second position, a distance 301, in which the first lens assembly 130 is moved along the optical axis, may be between about 1 mm and about 10 mm.

Also, a distance 303 in which the first lens assembly 130 protrudes from the upper wall 121 of the housing 120 at the second position may be within three times a height of the housing 120 that is a distance from a lower end of the housing 120 contacting the substrate 111 to the upper wall 121 of the housing 120 in a direction (the Z-axis direction) perpendicular to a main surface of the substrate 111. In some example embodiments, the distance 303 in which the first lens assembly 130 protrudes from the upper wall 121 of the housing 120 may be identical to the distance 301 in which the first lens assembly 130 is moved between the first position and the second position.

In example embodiments, according to the position change of the first lens assembly 130, distances of the first lens assembly 130 and the second lens assembly 140 according to the optical axis may vary.

In example embodiments, the first lens assembly 130 may be spaced apart from the second lens assembly 140. At the first position of the first lens assembly 130 where the first lens assembly 130 is closest to the second lens assembly 140, the first lens assembly 130 may be supported by the magnetic force applied between the first magnet 125 and the second magnet 135, and may be spaced apart from the second lens assembly 140. As the first lens assembly 130 is spaced apart from the second lens assembly 140, problems such as damage or a misalignment by a collision between the first lens assembly 130 and the second lens assembly 140 may be prevented.

According to example embodiments, in the camera operation mode for performing the photographing function of the camera, because the first lens assembly 130 may be stably fixed to the housing 120 by the magnetic force, the alignment reliability between lenses 133 may be improved, and thus, lenses 133 shaking by external impact may be reduced or prevented. Therefore, the quality of images obtained by using the camera module 100 may be improved.

Also, according to example embodiments, in the camera standby mode in which the photographing function of the camera is not performed, the first lens assembly 130 may be entirely accommodated in the housing 120, and thus, the miniaturization of the camera module 100 and an electronic device including the camera module 100 may be accomplished.

Figure 3A:
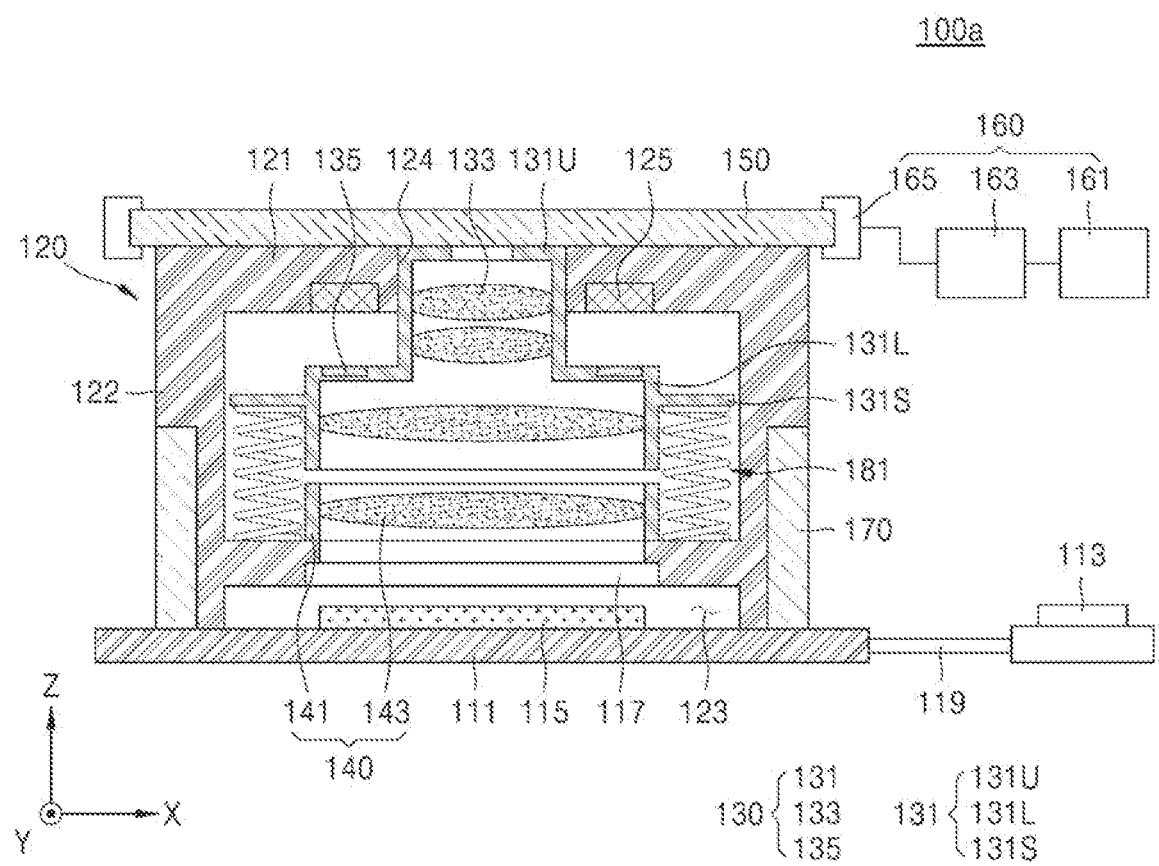
FIGS. 3A and 3B are cross-sectional views of a camera module according to example embodiments.
Figure 3B:
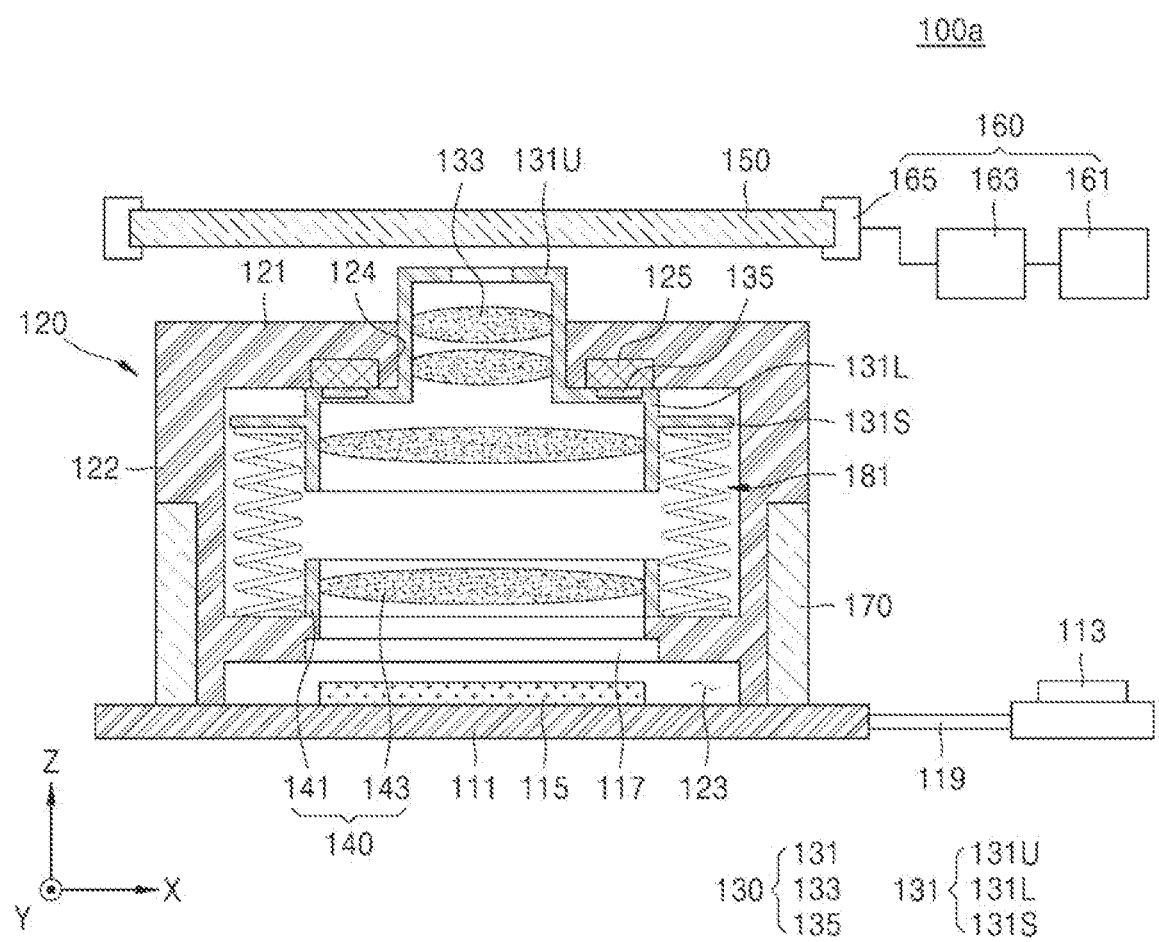

FIGS. 3A and 3B are cross-sectional views of a camera module 100a according to example embodiments.

Hereinafter, the camera module 100a of FIGS. 3A and 3B will be described by focusing on a difference with the camera module 100 described with reference to FIGS. 1 to 2B.

Referring to FIGS. 3A and 3B, the camera module 100a may include a first elastic body 181 that elastically supports the first lens assembly 130. The first elastic body 181 may provide a restoring force to the first lens assembly 130 in a direction from the first position to the second position of the first lens assembly 130.

The first lens barrel 131 may include a spring connection body 131S provided on the lower portion 131L of the first lens barrel 131. The spring connection body 131S may extend outward in the radial direction of the first lens barrel 131. A lower portion of the first elastic body 181 may be supported by the housing 120, and an upper portion of the first elastic body 181 may be connected to the spring connection body 131S.

In example embodiments, the first elastic body 181 may include a compression spring. In this case, a compression strain of the compression spring may have a maximum value when the first lens assembly 130 is at the first position.

As illustrated in FIG. 3A, the external force applied downwards to the first lens assembly 130 by the cover 150 at the first position of the first lens assembly 130 may be balanced with a sum of the magnetic force applied between the first and second magnets 125 and 135 and an external force applied upwards to the first lens assembly 130 by the first elastic body 181.

As illustrated in FIG. 3B, at the second position of the first lens assembly 130, the first lens assembly 130 may be stably fixed to the housing 120 by the magnetic force applied between the first magnet 125 and the second magnet 135 and the external force applied upwards to the first lens assembly 130 by the first elastic body 181.

Referring to FIGS. 3A and 3B sequentially, to move the first lens assembly 130 from the first position to the second position, the cover movement mechanism 160 may separate the cover 150 from the first lens assembly 130 by moving the cover 150 upwards. When the external force applied to the first lens assembly 130 by the cover 150 is removed, the first lens assembly 130 may be moved upwards by the magnetic force applied between the first magnet 125 and the second magnet 135 and the restoring force of the first elastic body 181. The lower portion 131L of the first lens barrel 131 is moved until the lower portion 131L of the first lens barrel 131 contacts the upper wall 121 of the housing 120, and thus the first lens assembly 130 may be provided at the second position.

While the first lens assembly 130 is moved from the first position to the second position, the restoring force of the first elastic body 181 may be the predominant force moving the first lens assembly 130 in an initial movement section, and the magnetic force applied between the first magnet 125 and the second magnet 135 may be the predominant force moving the first lens assembly 130 in a later movement section.

In other example embodiments, the first elastic body 181 may have a height at which the first elastic body 181 is separated from the spring connection body 131S, at the second position of the first lens assembly 130. In this case, while the first lens assembly 130 is moved from the first position to the second position, the first elastic body 181 may provide the restoring force to the first lens assembly 130 to an arbitrary intermediate point between the first position and the second position, and the movement of the first lens assembly 130 between the intermediate point and the second position may only be performed by the magnetic force applied between the first magnet 125 and the second magnet 135.

Referring to FIGS. 3B and 3A in sequence, to move the first lens assembly 130 from the second position to the first position, the cover movement mechanism 160 may press the first lens assembly 130 downwards by moving the cover 150 downwards. When the cover 150 is moved until the cover 150 contacts the upper wall 121 of the housing 120, the first lens assembly 130 pressed by the cover 150 may descend to the first position of the first lens assembly 130. At the first position of the first lens assembly 130, the external force applied to the first lens assembly 130 by the cover 150 may be balanced with a sum of the magnetic force applied between the first magnet 125 and the second magnet 135 and the external force applied upwards to the first lens assembly 130 by the first elastic body 181.

Figure 4A:
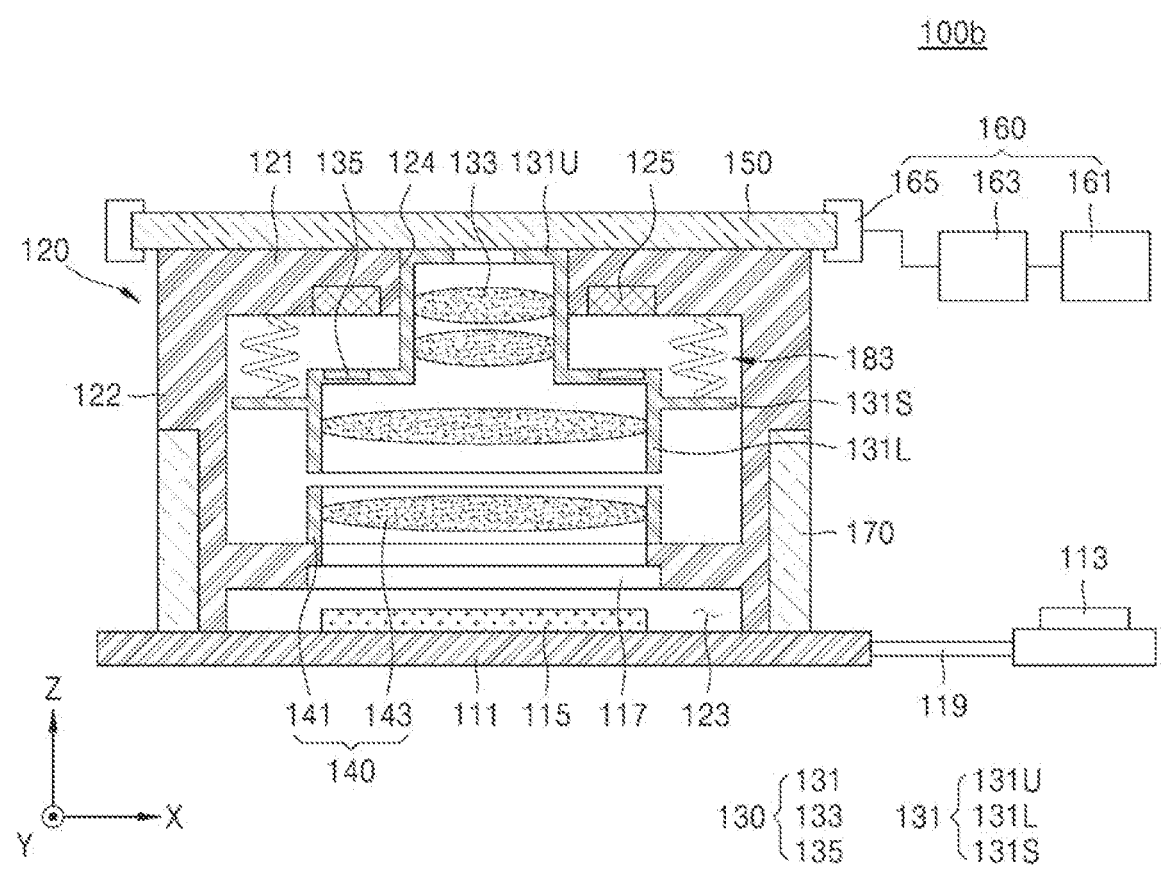
FIGS. 4A and 4B are cross-sectional views of a camera module according to example embodiments.
Figure 4B:
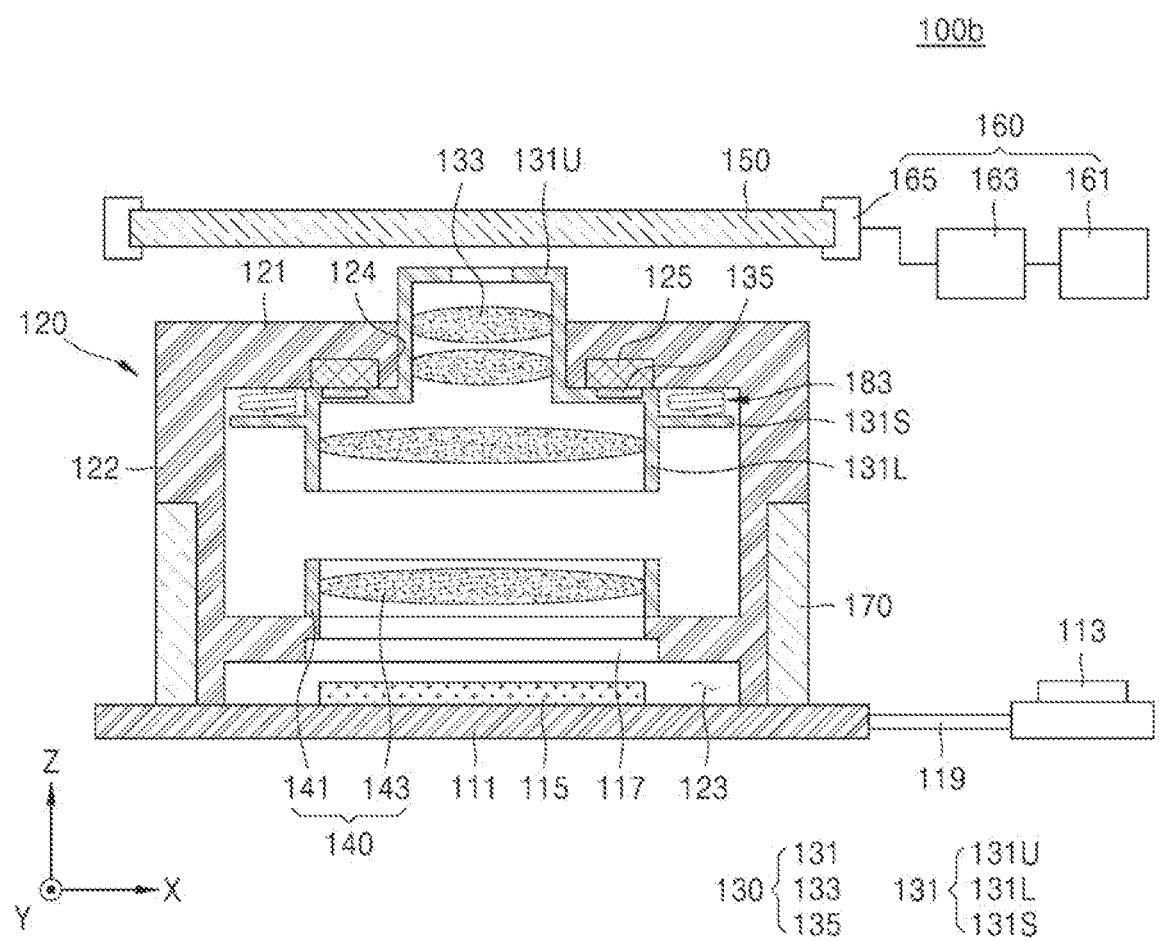

FIGS. 4A and 4B are cross-sectional views of a camera module 100b according to example embodiments.

The camera module 100b of FIGS. 4A and 4B may be substantially identical or similar to the camera module 100a of FIGS. 3A and 3B except that the camera module 100b includes a second elastic body 183 instead of the first elastic body 181. Hereinafter, the camera module 100b of FIGS. 4A and 4B will be described by focusing on a difference with the camera module 100a described with reference to FIGS. 3A and 3B.

Referring to FIGS. 4A and 4B, the camera module 100b may include the second elastic body 183 configured to elastically support the first lens assembly 130. The second elastic body 183 may provide a restoring force to the first lens assembly 130 in a direction from the first position to the second position of the first lens assembly 130.

The second elastic body 183 may include a tensile spring. In this case, a tensile strain of the tensile spring may have a maximum value when the first lens assembly 130 is at the first position. An upper portion of the second elastic body 183 may be coupled to the upper wall 121 of the housing 120, and a lower portion of the second elastic body 183 may be coupled to the spring connection body 131S provided to the lower portion 131L of the first lens barrel 131.

Figure 5A:
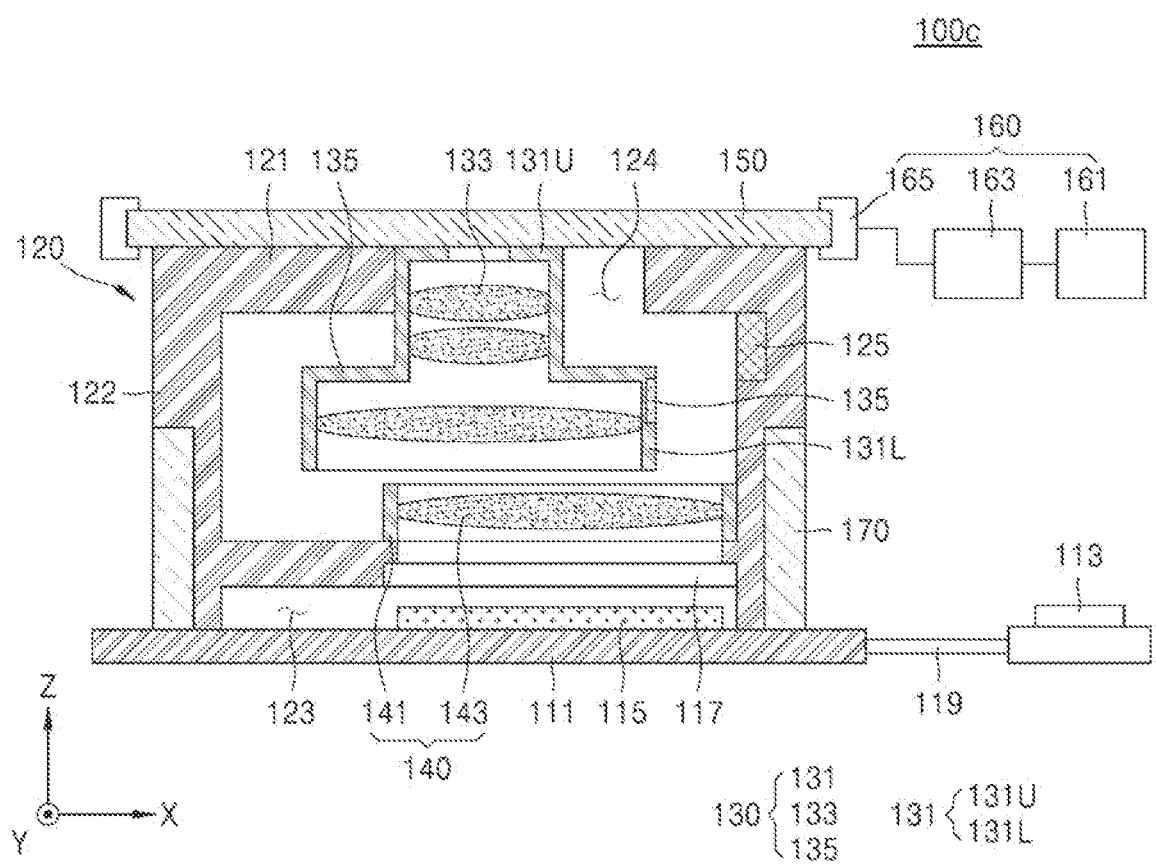
FIGS. 5A and 5B are cross-sectional views of a camera module according to example embodiments.
Figure 5B:
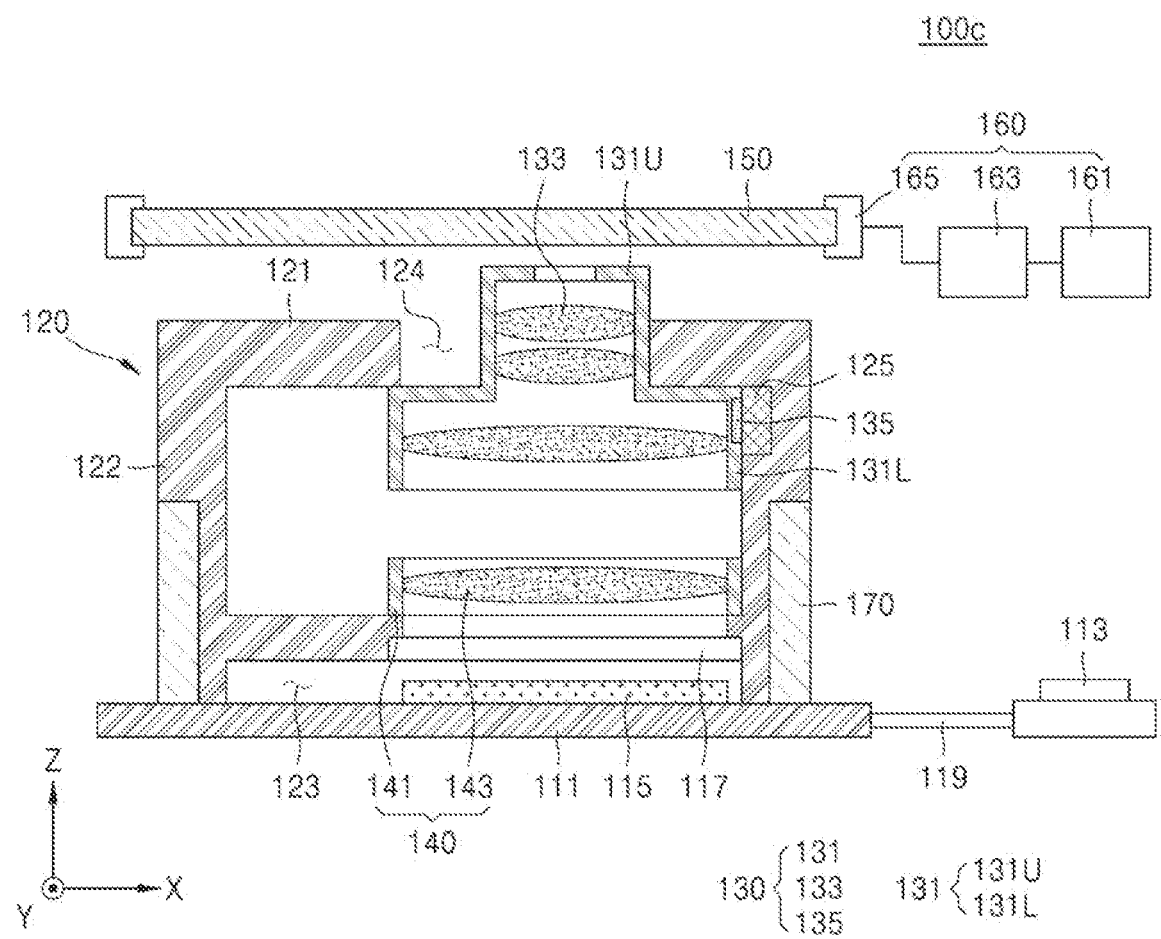

FIGS. 5A and 5B are cross-sectional views of a camera module 100c according to example embodiments.

Hereinafter, the camera module 100c of FIGS. 5A and 5B will be described by focusing on a difference with the camera module 100 described with reference to FIGS. 1, 2A and 2B.

Referring to FIGS. 5A and 5B, the first magnet 125 may be disposed on the side wall 122 of the housing 120, and the second magnet 135 may be disposed on a side surface of the lower portion 131L of the first lens barrel 131 that faces the side wall 122 of the housing 120. When the cover 150 is configured to apply the external force to the first lens assembly 130 in a first direction (e.g., the Z-axis direction) parallel to the optical axis of the first lens assembly 130, the magnetic force between the first magnet 125 and the second magnet 135 may be approximately applied in a second direction (e.g., the X-axis direction) perpendicular to the optical axis of the first lens assembly 130.

Because the magnetic force between the first magnet 125 and the second magnet 135 is approximately applied in the second direction (e.g., the X-axis direction) perpendicular to the optical axis of the first lens assembly 130, the position change of the first lens assembly 130 between the first position and the second position may include the movement of the first lens assembly 130 in the first direction (e.g., the Z-axis direction) parallel to the optical axis and the movement of the first lens assembly 130 in the second direction (e.g., the X-axis direction) perpendicular to the optical axis.

In example embodiments, the optical axes of the first lens assembly 130 and the second lens assembly 140 at the first position of the first lens assembly 130 are spaced apart from each other in the first direction (e.g., the X-axis direction), but the optical axes of the first lens assembly 130 and the second lens assembly 140 at the second position of the first lens assembly 130 may be the same as each other.

Figure 6:
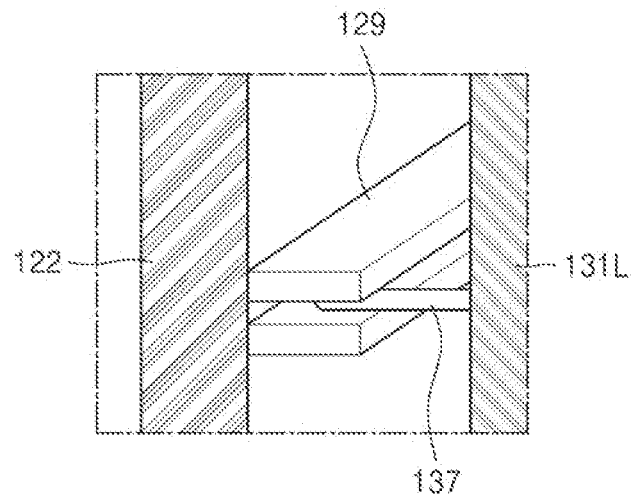
FIG. 6 is a cross-sectional perspective view illustrating a portion of the camera module of FIGS. 5A and 5B.
Figure 7:
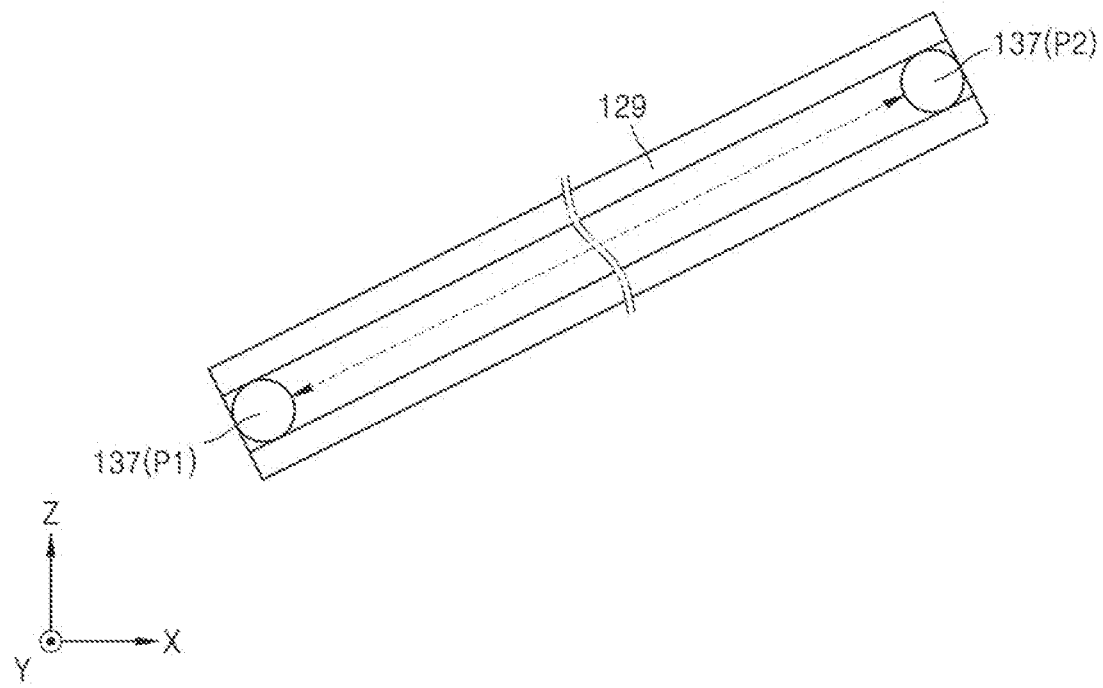
FIG. 7 is a schematic conceptual view of a movement path of a guide pin of a first lens barrel while the first lens assembly is moved between a first position and a second position of the first lens assembly.

FIG. 6 is a cross-sectional perspective view illustrating a portion of the camera module 100c of FIGS. 5A and 5B. FIG. 7 is a schematic conceptual view of a movement path of a guide pin 137 of the first lens barrel 131 while the first lens assembly 130 is moved between the first position and the second position. In FIG. 7, the reference numeral "137 (P1)" indicates a position of the guide pin 137 when the first lens assembly 130 is at the first position, and the reference numeral "137(P2)" indicates a position of the guide pin 137 when the first lens assembly 130 is at the second position.

Referring to FIGS. 5A, 5B, 6, and 7, to guide the movement of the first lens assembly 130 in the first direction (e.g., the Z-axis direction) and the second direction (e.g., the X-axis direction), a guide rail 129 may be provided on the inner surface of the side wall 122 of the housing 120 and the guide pin 137 may be provided on the lower portion of the first lens assembly 130. The guide rail 129 may extend obliquely in both of the first direction (e.g., the Z-axis direction) and the second direction (e.g., the X-axis direction). The guide pin 137 may be engaged with the guide rail 129.

Referring to FIGS. 5A and 5B sequentially, to move the first lens assembly 130 from the first position to the second position, the cover movement mechanism 160 may separate the cover 150 from the first lens assembly 130 by moving the cover 150 upwards. When the external force applied to the first lens assembly 130 by the cover 150 is removed, the first lens assembly 130 is moved from the first position to the second position by the magnetic force applied between the first magnet 125 and the second magnet 135. While the first lens assembly 130 is moved, the first lens assembly 130 may be guided by the guide rail 129 and moved obliquely in the first direction (e.g., the Z-axis direction) and the second direction (e.g., the X-axis direction), respectively. When the first lens assembly 130 is moved when the lower portion 131L of the first lens assembly 130 contacts the side wall 122 of the housing 120 on which the first magnet 125 is located, the first lens assembly 130 may be fixed at the second position by the magnetic force applied between the first magnet 125 and the second magnet 135.

Referring to FIGS. 5B and 5A sequentially, to move the first lens assembly 130 from the second position to the first position, the cover movement mechanism 160 may press the first lens assembly 130 downwards by moving the cover 150 downwards. The cover 150 is moved until the cover 150 contacts the upper wall 121 of the housing 120, and thus the first lens assembly 130 pressed by the cover 150 may be moved to the first position. While the first lens assembly 130 is moved, the first lens assembly 130 may be guided by the guide rail 129 and may be moved obliquely in the first direction (e.g., the Z-axis direction) and the second direction (e.g., the X-axis direction), respectively.

Figure 8A:
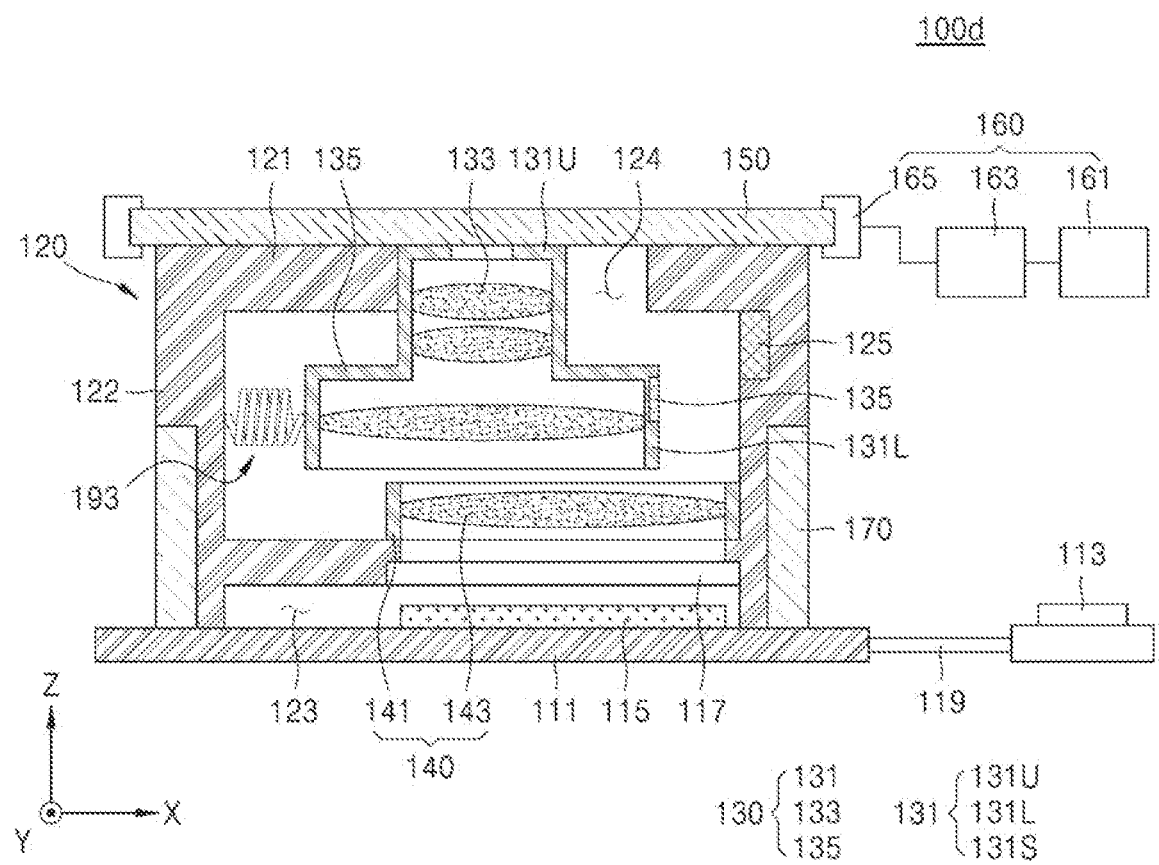
FIGS. 8A and 8B are cross-sectional views of a camera module according to example embodiments.
Figure 8B:
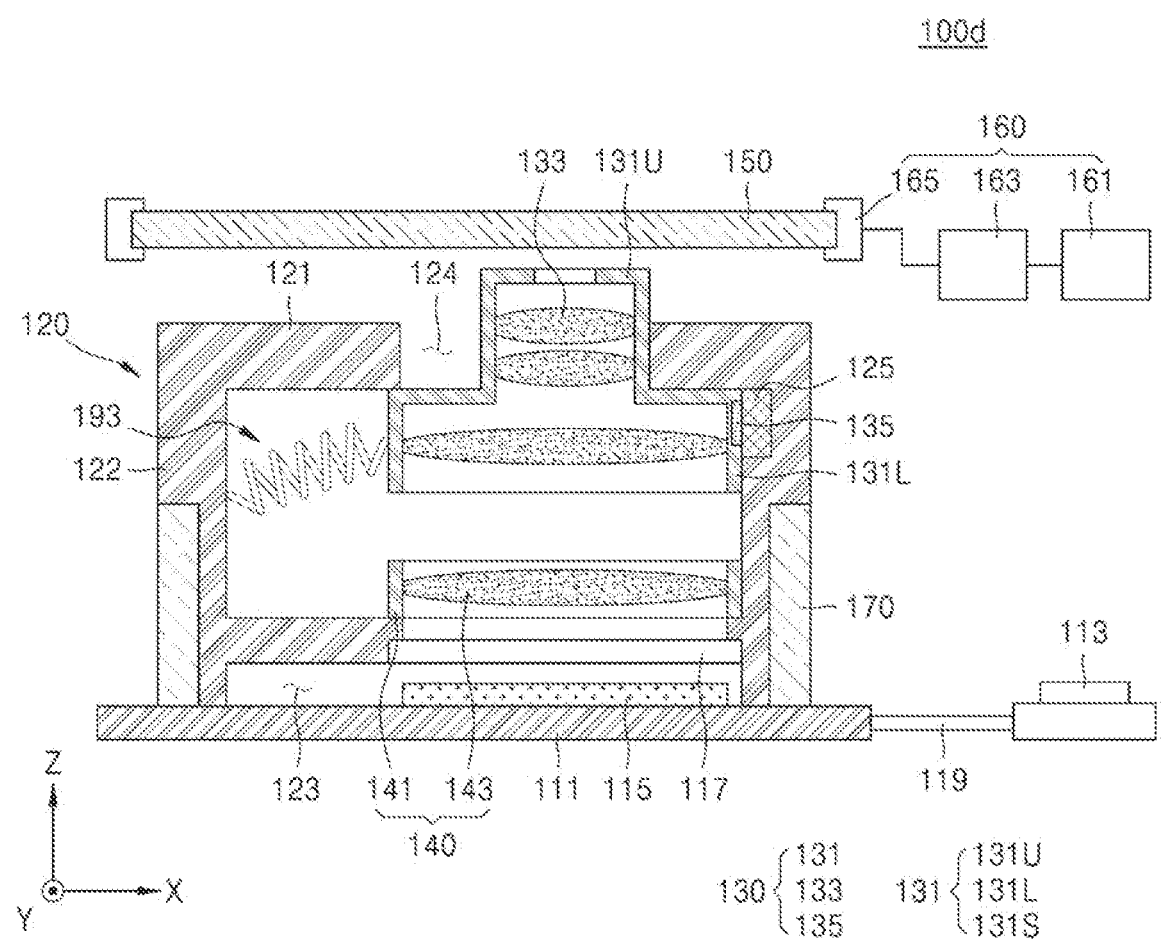

FIGS. 8A and 8B are cross-sectional views of a camera module 100d according to example embodiments.

Hereinafter, the camera module 100d of FIGS. 8A and 8B will be described by focusing on a difference with the camera module 100c described with reference to FIGS. 5A, 5B, 6, and 7.

Referring to FIGS. 8A and 8B, while the first lens assembly 130 is moved between the first position and the second position, the first lens assembly 130 may be moved in a first direction (e.g., the Z-axis direction) parallel to the optical axis and in a second direction (e.g., the X-axis direction) perpendicular to the optical axis.

The camera module 100d may include a tensile spring 193 disposed between the housing 120 and the first lens barrel 131. The tensile spring 193 may be located on another portion of the side wall 122 of the housing 120 that is opposite to a portion of the side wall 122 of the housing 120 on which the first magnet 125 is located. The tensile spring 193 may be configured to apply, to the first lens assembly 130, the external force applied in an opposite direction to the magnetic force applied between the first magnet 125 and the second magnet 135.

Referring to FIGS. 8A and 8B sequentially, to move the first lens assembly 130 from the first position to the second position, the cover movement mechanism 160 may separate the cover 150 from the first lens assembly 130 by moving upwards the cover 150 that presses the first lens assembly 130 downwards. When the external force applied to the first lens assembly 130 by the cover 150 is removed, the first lens assembly 130 may be moved from the first position to the second position by the magnetic force applied between the first magnet 125 and the second magnet 135. When the lower portion 131L of the first lens barrel 131 is in contact with the side wall 122 of the housing 120 on which the first magnet 125 is located, the first lens assembly 130 may be fixed to the second position by the magnetic force applied between the first magnet 125 and the second magnet 135. To fix the first lens assembly 130 to the second position, a restoring force of the tensile spring 193 at the second position of the first lens assembly 130 may be less than the magnetic force applied between the first magnet 125 and the second magnet 135.

Referring to FIGS. 8B and 8A sequentially, to move the first lens assembly 130 from the second position to the first position, the cover movement mechanism 160 may press downwards the first lens assembly 130 by moving the cover 150 downwards. As the first lens assembly 130 pressed by the cover 150 is moved downwards by a certain distance, the first magnet 125 may be separated from the second magnet 135. Then, the restoring force of the tensile spring 193 may move the first lens assembly 130 in a direction farther from one side wall 122 of the housing 120, on which the first magnet 125 is located, until the first lens assembly 130 is positioned at the first position.

Figure 9A:
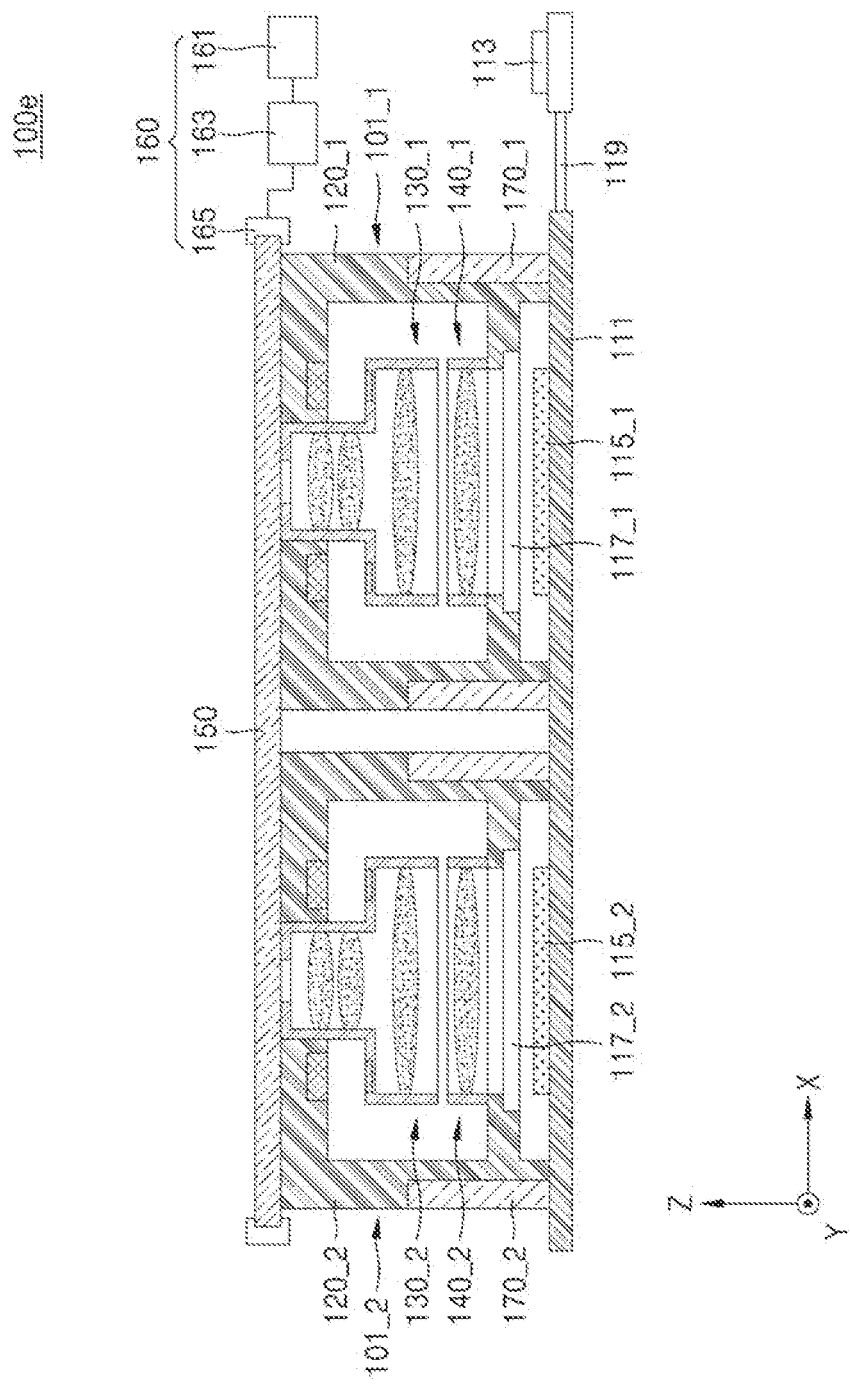
FIGS. 9A and 9B are cross-sectional views of a camera module according to example embodiments.
Figure 9B:
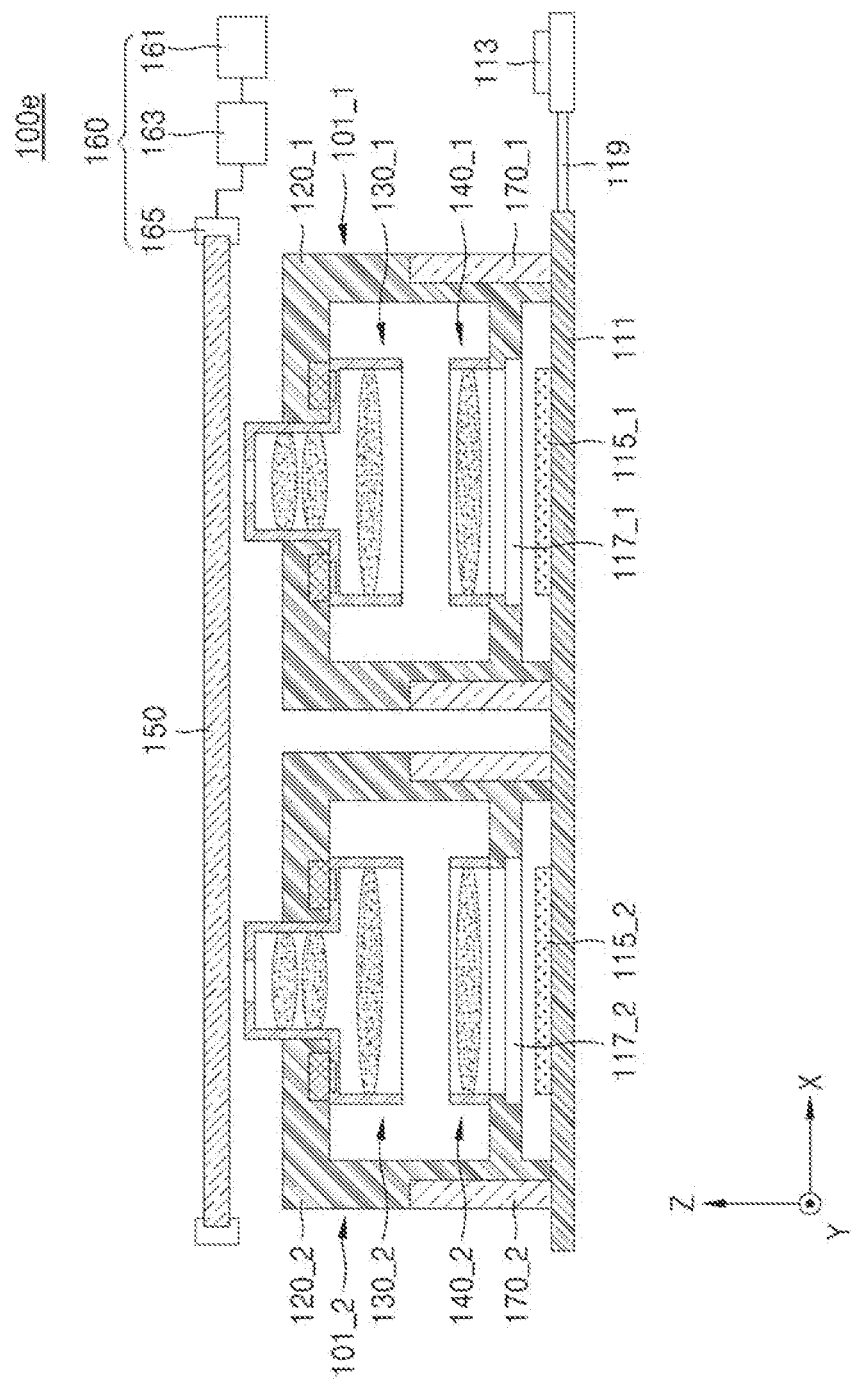

FIGS. 9A and 9B are cross-sectional views of a camera module 100e according to example embodiments.

The camera module 100e of FIGS. 9A and 9B will be described by focusing on a difference with the camera module 100 described with reference to FIGS. 1, 2A and 2B.

Referring to FIGS. 9A and 9B, the camera module 100e may include a first sub-module 101_1 and a second sub-module 101_2 arranged on the substrate 111.

The first sub-module 101_1 may include a housing 120_1, an image sensor 115_1, an optical filter 117_1, a first lens assembly 130_1, and a second lens assembly 140_1. The second sub-module 101_2 may include a housing 120_2, an image sensor 115_2, an optical filter 117_2, a first lens assembly 130_2, and a second lens assembly 140_2. For example, the first sub-module 101_1 and the second sub-module 101_2 may be substantially the same as or similar to the camera module 100 of FIGS. 2A and 2B except for the substrate 111, the cover 150, and the cover movement mechanism 160.

FIGS. 9A and 9B illustrate that the housing 120_1 of the first sub-module 101_1 and the housing 120_2 of the second sub-module 101_2 are separated from each other, but the housing 120_1 of the first sub-module 101_1 and the housing 120_2 of the second sub-module 101_2 may be integrally formed.

The camera module 100e may include the cover 150 disposed on the first sub-module 101_1 and the second sub-module 101_2, and the cover movement mechanism 160 for driving the cover 150. The cover 150 may have an area to entirely cover the first sub-module 101_1 and the second sub-module 101_2. The cover movement mechanism 160 may move the cover 150 and press the first lens assembly 130_1 of the first sub-module 101_1 and the first lens assembly 130_2 of the second sub-module 101_2 together.

In this case, positions of the first lens assembly 130_1 of the first sub-module 101_1 and the first lens assembly 130_2 of the second sub-module 101_2 may be simultaneously changed. For example, the cover movement mechanism 160 may move the cover 150 upwards and may simultaneously move the first lens assembly 130_1 of the first sub-module 101_1 and the first lens assembly 130_2 of the second sub-module 101_2 from the first position to the second position. Also, the cover movement mechanism 160 may move the cover 150 downwards and may simultaneously move the first lens assembly 130_1 of the first sub-module 101_1 and the first lens assembly 130_2 of the second sub-module 101_2 from the second position to the first position.

In other example embodiments, the cover 150 for pressing the first lens assembly 130_1 of the first sub-module 101_1 and the cover 150 for pressing the first lens assembly 130_2 of the second sub-module 101_2 may be separated from each other. In this case, the position changes of the first lens assembly 130_1 of the first sub-module 101_1 and the first lens assembly 130_2 of the second sub-module 101_2 may be independently controlled.

Figure 10:
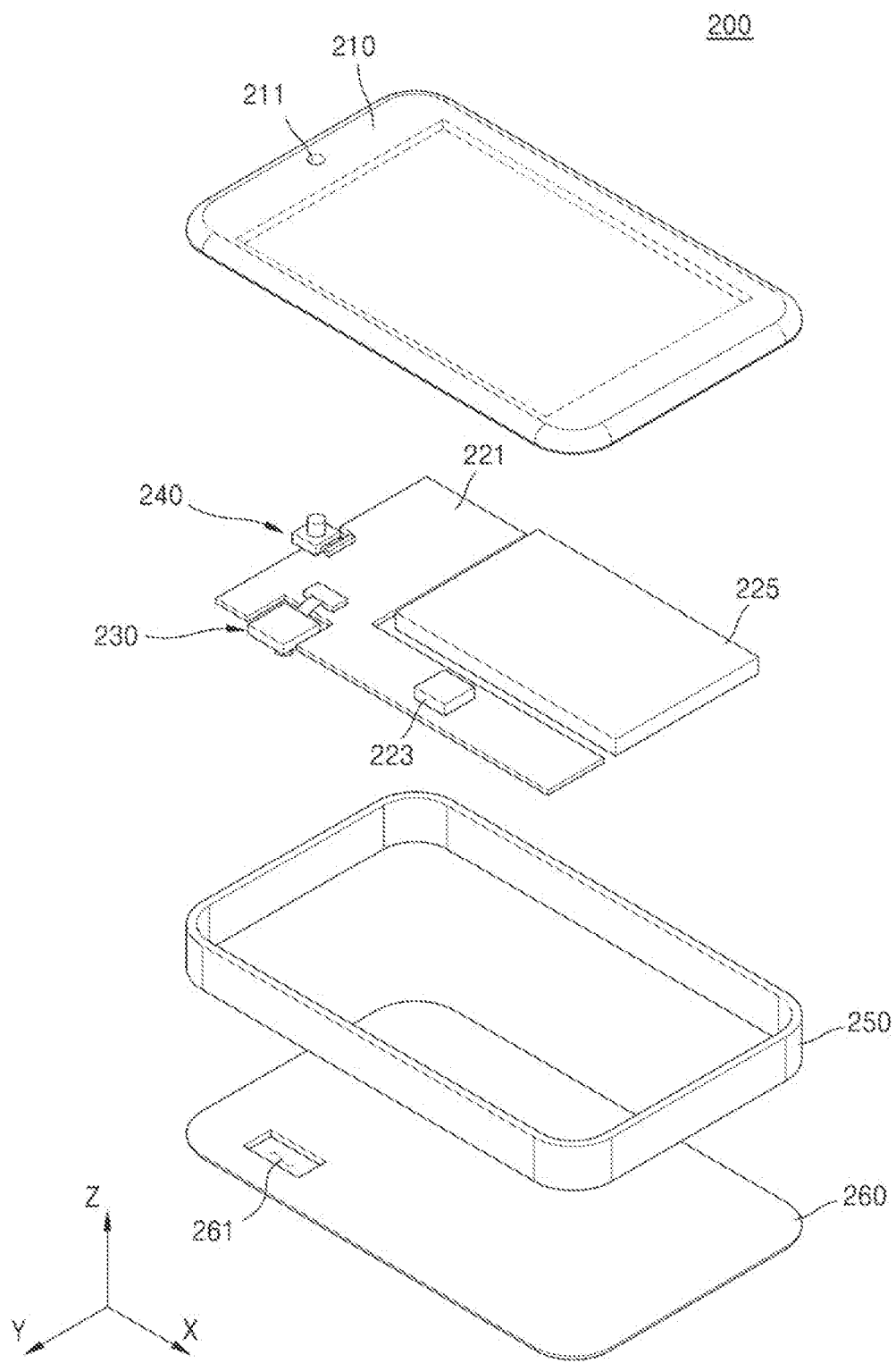
FIG. 10 is an exploded perspective view of an electronic device according to example embodiments.

FIG. 10 is an exploded perspective view of an electronic device 200 according to example embodiments.

Hereinafter, an example in which the electronic device 200 is a smartphone will be described. However, the electronic device 200 is not limited to a smartphone. For example, the electronic device 200 may correspond to any one of a digital still camera, a digital video camera, a smartphone, a wearable device, an IoT device, a tablet PC, a PDA, a PMP, and a navigation device. Also, the electronic device 200 may correspond to a home appliance such as a refrigerator, a clothes dryer, a vacuum cleaner, or a television, a transportation apparatus such as a vehicle, a ship, or an aircraft, an industrial robot, or the like.

Referring to FIG. 10, the electronic device 200 may include a main board 221, a front-facing camera module 240, a rear-facing camera module 230, an electronic component 223, a front panel 210, a rear panel 260, and a frame 250.

The main board 221 may include, for example, a PCB. The front-facing camera module 240, the rear-facing camera module 230, and the electronic component 223 may be connected to the main board 221. The front-facing camera module 240 may face a front surface of the electronic device 200, that is, the front panel 210, and the rear-facing camera module 230 may face a rear surface of the electronic device 200, that is, the rear panel 260.

In example embodiments, the front-facing camera module 240 and the rear-facing camera module 230 may each correspond to any one of the camera modules 100, 100a, 100b, 100c, 100d, and 100e described above with reference to FIGS. 1 to 9B.

The electronic component 223 may include, for example, a memory, a processor, and/or an interface. The memory may include, for example, dynamic random access memory (DRAM), static random access memory (SRAM), flash memory, electrically erasable and programmable read-only memory (EEPROM), phase-change random access memory (PRAM), magnetic random access memory (MRAM), and/ or resistive random access memory (RRAM). The processor may include, for example, a central processing unit (CPU), a graphics processing unit (GPU), and/or an application processor (AP). The interface may include, for example, high definition multimedia interface (HDMI), universal serial bus (USB) interface, SD card interface, and/or audio interface.

In example embodiments, the electronic device 200 may further include a battery 225 connected to the main board 221. In example embodiments, the electronic device 200 may further include a communication module, a microphone, a speaker, a fingerprint sensor, a gyroscope sensor, a biosensor, an illumination sensor, a humidity sensor, a temperature sensor, and/or a flashlight.

The front panel 210 and the rear panel 260 may face each other, and the frame 250 may be provided between the front panel 210 and the rear panel 260. The front panel 210, the frame 250, and the rear panel 260 may form an exterior of the electronic device 200. For example, the front panel 210, the frame 250, and the rear panel 260 may be exposed to the outside of the electronic device 200. For example, the front panel 210 may form a front surface of the electronic device 200, and the rear panel 260 may form a rear surface of the electronic device 200. The frame 250 may form side surfaces of the electronic device 200.

The main board 221, the front-facing camera module 240, the rear-facing camera module 230, the electronic component 223, the battery 225 may be accommodated in a space formed by the front panel 210, the frame 250, and the rear panel 260. The frame 250 may surround a space where the main board 221, the front-facing camera module 240, the rear-facing camera module 230, the electronic component 223, and the battery 225 are located in a plan view. The front panel 210 and the rear panel 260 may cover the space where the main board 221, the front-facing camera module 240, the rear-facing camera module 230, the electronic component 223, and the battery 225 are located.

The front panel 210 may be coupled to the frame 250 to cover a first surface of the main board 221. The front panel 210 may include a display. Also, the front panel 210 may further include a touch input panel. The front panel 210 may include a window 211 through which the front-facing camera module 240 receives light.

The rear panel 260 may be coupled to the frame 250 to cover a second surface opposite to the first surface of the main board 221. The rear panel 260 may include a hole 261 in the rear-facing camera module 230 mounted. For example, when the rear-facing camera module 230 is the camera module 100 of FIGS. 1 to 2B, the cover 150 may be moved through the hole 261 in the rear panel 260.

According to example embodiments, the rear-facing camera module 230 may stably fix the lens assembly by using the magnetic force in the camera operation mode for performing the photographing function of the camera, and thus, the quality of images obtained by the rear-facing camera module 230 may be improved.

According to example embodiments, in the camera standby mode in which the photographing function is not performed, the rear-facing camera module 230 may be moved inside the rear panel 260 and not protrude from the rear panel 260 or reduce a protruding height. Accordingly, user inconvenience according to the excessive protrusion of the rear-facing camera module 230 may be removed.

Figure 11:
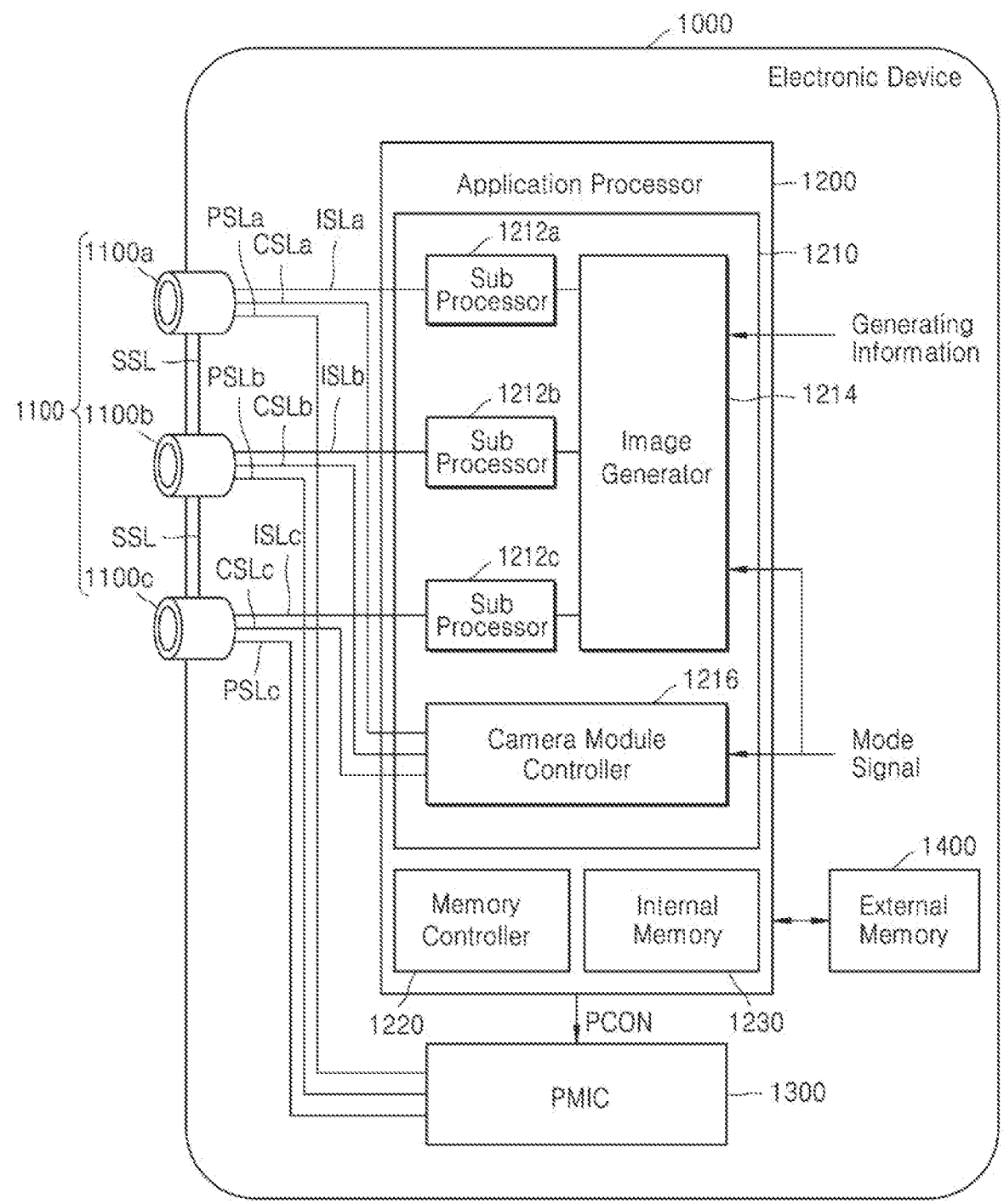
FIG. 11 is a block diagram of an electronic device including a camera module, according to example embodiments.
Figure 12:
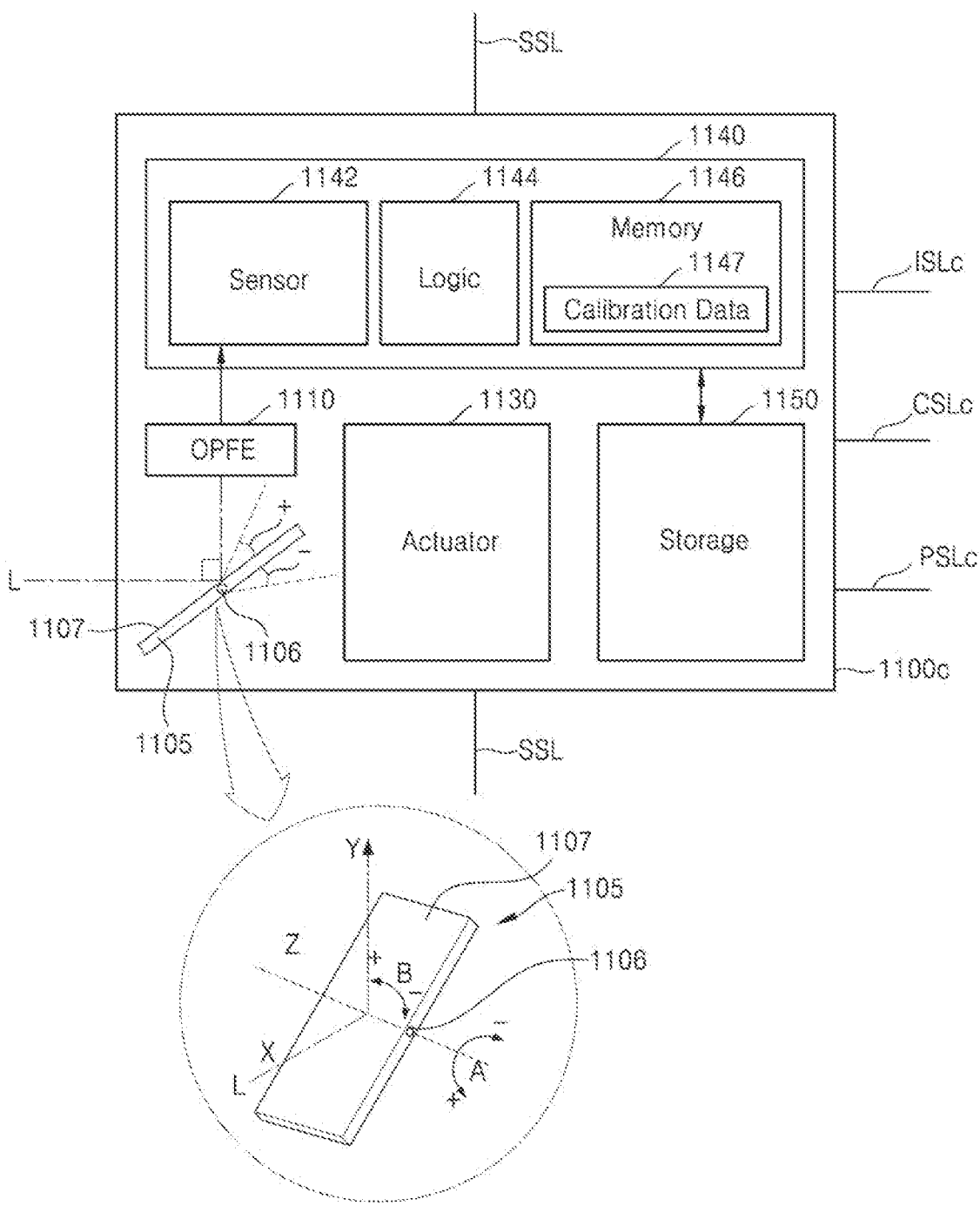
FIG. 12 is a detailed block diagram of the camera module of FIG. 11.

FIG. 11 is a block diagram of an electronic device 1000 including a camera module, according to example embodiments. FIG. 12 is a detailed block diagram of the camera module of FIG. 11.

Referring to FIG. 11, the electronic device 1000 may include a camera module group 1100, an application processor 1200, a power management integrated circuit (PMIC) 1300, and an external memory 1400.

The camera module group 1100 may include camera modules 1100a, 1100b, and 1100c. Although the drawings illustrate that three camera modules 1100a, 1100b, and 1100c are arranged, embodiments are not limited thereto. In some example embodiments, the camera module group 1100 may be modified to include only two camera modules. Also, in some example embodiments, the camera module group 1100 may be modified to include n camera modules (where, n is a natural number equal to or greater than 4). The camera modules 100, 100a, 100b, 100c, 100d, and 100e according to the example embodiments described with reference to FIGS. 1 to 9B may be applied as at least one of the camera modules 1100a, 1100b, and 1100c.

In an example embodiment, one of the camera modules 1100a, 1100b, and 1100c, for example, the camera module 1100c, may include an optical path folding element (OPFE) (1110 of FIG. 12). Other camera modules (e.g., the camera modules 1100a and 1100b) may be vertical camera modules that do not include OPFEs, but embodiments are not limited thereto.

Referring to FIG. 12, a detailed structure of the camera module 1100c will be described in detail.

Referring to FIG. 12, the camera module 1100c may include a prism 1105, the OPFE 1110, an actuator 1130, an image sensing apparatus 1140, and a storage 1150.

The prism 1105 may include a reflection surface 1107 including a light reflection material and may change a path of light L incident from the outside.

In an example embodiment, the prism 1105 may change the path of the light L, which is incident in a first direction X, to be in a second direction Y perpendicular to the first direction X. Also, the prism 1105 may rotate, in an A direction, the reflection surface 1107 of the light reflection material on a central axis 1106 or may rotate the central axis 1106 in a B direction, thereby changing the path of the light L, which is incident in the first direction X, to be in the second direction Y perpendicular to the first direction X. In this case, the OPFE 1110 may be moved in a third direction Z that is perpendicular to the first direction X and the second direction Y.

In an example embodiment, as shown in the drawing, a maximum degree of rotation of the prism 1105 in an A direction may be less than or equal to 15 degrees in a +A direction and may be greater than 15 degrees in a −A direction. However, embodiments are not limited thereto.

In an embodiment, the prism 1105 may be moved in a range of about 20 degrees, between about 10 degrees and about 20 degrees, or between about 15 degrees and about 20 degrees in a + or −B direction. Here, the angle that is moved may be identical in the + or −B direction or may be similar in a range of about 1 degree.

In an embodiment, the prism 1105 may move the reflection surface 1107 of the light reflection material in the third direction (e.g., the Z-axis direction) parallel to an extension direction of the central axis 1106.

The OPFE 1110 may include, for example, an optical lens including m groups (where, m is a natural number). The m lenses may be moved in the second direction Y and may change an optical zoom ratio of the camera module 1100*b*. For example, when a basic optical zoom ratio of the camera module 1100*b* is Z, and when m optical lenses included in the OPFE 1110 are moved, an optical zoom ratio of the camera module 1100*b* may be changed to 3Z, 5Z, or more.

The actuator 1130 may move the OPFE 1110 or the optical lens (hereinafter, referred to as the optical lens) to a certain position. For example, the actuator 1130 may adjust a position of the optical lens to allow an image sensor 1142 to be in a focal length of the optical lens for accurate sensing.

The image sensing apparatus 1140 may include the image sensor 1142, a control logic 1144, and a memory 1146. The image sensor 1142 may sense an image, which is a sensing target, by using the light L provided through the optical lens.

The control logic 1144 may control all operations of the camera module 1100*c*. For example, the control logic 1144 may control the operation of the camera module 1100*b* in response to a control signal provided through a control signal line CSLc.

The memory 1146 may store information, for example, calibration data 1147, which is required to operate the camera module 1100*c*. The calibration data 1147 may include information that the camera module 1100*c* requires to generate image data by using the light L provided from the outside. The calibration data 1147 may include, for example, information regarding the above-described degree of rotation, information regarding the focal length, information regarding the optical axis, and the like. When the camera module 1100*b* is a multi-state camera of which a focal length changes according to a position of the optical lens, the calibration data 1147 may include a focal length value and information regarding auto-focusing at each position (or each state) of the optical lens.

The storage 1150 may store the image data that is sensed by the image sensor 1142. The storage 1150 may be disposed outside the image sensing apparatus 1140 and may be stacked with a sensor chip forming the image sensing apparatus 1140. In some example embodiments, the storage 1150 may be realized as EEPROM, but embodiments are not limited thereto.

Referring to FIGS. 11 and 12, in an example embodiment, the camera modules 1100*a*, 1100*b*, and 1100*c* may each include the actuator 1130. Accordingly, each of the camera modules 1100*a*, 1100*b*, and 1100*c* may include identical or different pieces of the calibration data 1147 according to operation of the actuator 1130 included in each of the camera modules 1100*a*, 1100*b*, and 1100*c*.

Referring back to FIG. 11, one of the camera modules 1100*a*, 1100*b*, and 1100*c* (e.g., the camera module 1100*a*) may be, for example, a depth camera of a vertical type used to extract depth information by using IR. In this case, the application processor 1200 may merge the image data received from the depth camera with image data provided from another camera module (e.g., the camera module 1100*b* or 1100*c*) such that a 3D depth image may be generated.

In an example embodiment, at least two of the camera modules 1100*a*, 1100*b*, and 1100*c* (e.g., the camera modules 1100*a* and 1100*b*) may have different fields of view (viewing angles). In this case, for example, at least two of the camera modules 1100*a*, 1100*b*, and 1100*c* (e.g., the camera modules 1100*a* and 1100*b*) may have different optical lenses, but embodiments are not limited thereto.

Also, in an example embodiment, the camera modules 1100*a*, 1100*b*, and 1100*c* may have different viewing angles. In this case, the camera modules 1100*a*, 1100*b*, and 1100*c* may have different optical lenses, but embodiments are not limited thereto.

In an example embodiment, the camera modules 1100*a*, 1100*b*, and 1100*c* may be physically separated from each other. For example, the camera modules 1100*a*, 1100*b*, and 1100*c* do not divide and use a sensing area of one image sensor 1142, but may respectively include the image sensors 1142.

The application processor 1200 may include an image processor 1210, a memory controller 1220, and an internal memory 1230. The application processor 1200 may be separated from the camera modules 1100*a*, 1100*b*, and 1100*c*. For example, the application processor 1200 and the camera modules 1100*a*, 1100*b*, and 1100*c* may be realized as separate semiconductor chips.

The image processor 1210 may include sub-image processors 1212*a*, 1212*b*, and 1212*c*, an image generator 1214, and a camera module controller 1216.

The image processor 1210 may include the sub-image processors 1212*a*, 1212*b*, and 1212*c* of which the number corresponds to the number of camera modules 1100*a*, 1100*b*, and 1100*c*.

Image data respectively generated by the camera modules 1100*a*, 1100*b*, and 1100*c* may be provided to the corresponding sub-image processors 1212*a*, 1212*b*, and 1212*c* through image signal lines ISLa, ISLb, and ISLc that are separated from each other. For example, the image data generated by the camera module 1100*a* may be provided to the sub-image processor 1212*a* through the image single line ISLa, the image data generated by the camera module 1100*b* may be provided to the sub-image processor 1212*b* through the image single line ISLb, and the image data generated by the camera module 1100*c* may be provided to the sub-image processor 1212*c* through the image single line ISLc. The image data transmission may be performed by using, for example, a camera serial interface (CSI) based on a mobile industry processor interface (MIPI), but embodiments are not limited thereto.

In an example embodiment, one sub-image processor may be arranged corresponding to camera modules. For example, the sub-image processor 1212*a* and the sub-image processor 1212*c* may not be separated from each other as shown in the drawing, but may be integrally formed into one sub-image processor. The image data provided from the camera modules 1100*a* and 1100*c* may be selected by a selection device (e.g., a multiplexer), etc. and then provided to the integrated sub-image processor.

The image data provided to each of the sub-image processors 1212*a*, 1212*b*, and 1212*c* may be provided to the image generator 1214. The image generator 1214 may generate an output image by using the image data provided from each of the sub-image processors 1212*a*, 1212*b*, and 1212*c*, according to image generating information or a mode signal.

In detail, the image generator 1214 may merge at least some pieces of the image data generated by the camera modules 1100*a*, 1100*b*, and 1100*c* having different viewing angles according to the image generating information or the mode signal and then may generate an output image. Also, the image generator 1214 may select any one of the image data generated by the camera modules 1100*a*, 1100*b*, and 1100c having different viewing angles according to the image generating information or the mode signal and thus may generate the output image.

In an example embodiment, the image generating information may include a zoom signal or a zoom factor. Also, in an example embodiment, the mode signal may be, for example, a signal based on a mode selected by a user.

When the image generating information is a zoom signal (a zoom factor) and the camera modules 1100a, 1100b, and 1100c have different fields of view (viewing angles), the image generator 1214 may perform different operations according to types of zoom signals. For example, when the zoom signal is a first signal, after the image data output from the camera module 1100a is merged with the image data output from the camera module 1100c, an output image may be generated by using the merged image data and the image data output from the camera module 1100b and not used during the above data merging. When the zoom signal is a second signal different from the first signal, the image generator 1214 may select any one of the image data output from the camera modules 1100a, 1100b, and 1100c instead of performing the image data merging and may generate the output image. However, embodiments are not limited thereto, and according to necessity, a method of processing image data may vary.

In an example embodiment, the image generator 1214 may receive multiple pieces of image data having different exposure times from at least one of the sub-image processors 1212a, 1212b, and 1212c and may perform high dynamic range (HDR) processing on the pieces of the image data, thereby generating the merged image data of which a dynamic range is increased.

The camera module controller 1216 may provide control signals to the camera modules 1100a, 1100b, and 1100c, respectively. The control signals generated from the camera module controller 1216 may be provided to corresponding camera modules 1100a, 1100b, and 1100c through the control signal lines CSLa, CSLb, and CSLc that are separated from each other.

Any one of the camera modules 1100a, 1100b, and 1100c (e.g., the camera module 1100b) may be designated as a master camera according to the image generating information including a zoom signal or to the mode signal, and the others of the camera modules 1100a, 1100b, and 1100c (e.g., the camera modules 1100a and 1100c) may be designated as a slave camera. Such information may be included in the control signal and may be provided to the corresponding camera modules 1100a, 1100b, and 1100c through the control signal lines CSLa, CSLb, and CSLc that are separated from each other.

According to a zoom factor or an operation mode signal, a camera module functioning as a master and slave may change. For example, when the viewing angle of the camera module 1100a is greater than that of the camera module 1100b and the zoom factor indicates a low zoom ratio, the camera module 1100b may function as a master, and the camera module 1100a may function as a slave. On the contrary, when the zoom factor indicates a high zoom ratio, the camera module 1100a may function as a master, and the camera module 1100b may function as a slave.

In an example embodiment, the control signal provided to each of the camera modules 1100a, 1100b, and 1100c from the camera module controller 1216 may include a sync enable signal. For example, when the camera module 1100b is a master camera and the camera modules 1100a and 1100c are slave cameras, the camera module controller 1216 may transmit the sync enable signal to the camera module 1100b.

The camera module 1100b receiving the sync enable signal may generate a sync signal in response to the received sync enable signal and may provide the generated sync signal to the camera modules 1100a and 1100c through a sync signal line SSL. The camera module 1100b and the camera modules 1100a and 1100c may transmit the image data to the application processor 1200 in synchronization with the sync signal.

In an example embodiment, the control signals provided to the camera modules 1100a, 1100b, and 1100c from the camera module controller 1216 may include mode information according to a mode signal. Based on the mode information, the camera modules 1100a, 1100b, and 1100c may operate in a first operation mode and a second operation mode with regard to sensing speed.

In the first operation mode, the camera modules 1100a, 1100b, and 1100c may generate an image signal at a first speed (e.g., generate an image signal of a first frame rate), encode the image signal at a second speed that is greater than the first speed (e.g., encode the image signal of a second frame rate that is greater than the first frame rate), and transmit the encoded image signal to the application processor 1200. In this case, the second speed may be less than or equal to 30 times the first speed.

The application processor 1200 may store the received image signal, in other words, the encoded image signal, in the internal memory 1230 inside the application processor 1200 or in the external memory 1400 outside the application processor 1200. Then, the application processor 1200 may read the encoded image signal from the internal memory 1230 or the external memory 1400 and decode the same, and may display image data generated according to the decoded image signal. For example, a corresponding one of the sub-image processors 1212a, 1212b, and 1212c of the image processor 1210 may perform decoding and also image processing on the decoded image signal.

In the second operation mode, the camera modules 1100a, 1100b, and 1100c may generate an image signal at a third speed that is less than the first speed (e.g., generate an image signal of a third frame rate that is less than the first frame rate) and may transmit the image signal to the application processor 1200. The image signal provided to the application processor 1200 may be a signal that is not encoded. The application processor 1200 may perform image processing on a received image signal or may store an image signal in the internal memory 1230 or the external memory 1400.

The PMIC 1300 may supply power, for example, a power voltage, to each of the camera modules 1100a, 1100b, and 1100c. For example, under the control of the application processor 1200, the PMIC 1300 may supply first power to the camera module 1100a through a power signal line PSLa, supply second power to the camera module 1100b through a power signal line PSLb, and supply third power to the camera module 1100c through a power signal line PSLc. As described above, the camera module 1100c may include therein a PMIC, and the PMIC may generate power voltages according to the power voltage provided from the PMIC 1300.

In response to a power control signal PCON from the application processor 1200, the PMIC 1300 may generate power corresponding to each of the camera modules 1100a, 1100b, and 1100c and may adjust a power level. The power control signal PCON may include a power adjustment signal for an operation mode of each of the camera modules 1100a, 1100b, and 1100c. For example, the operation mode may include a low power mode, and in this case, the power control signal PCON may include information regarding a camera module operating in the low power mode and a set power level. The power levels of the camera modules 1100a, 1100b, and 1100c may be identical to or different from each other. Also, the power levels may dynamically change.

While example embodiments have been particularly shown and described with reference to drawings thereof, it will be understood that various changes in form and details may be made therein without departing from the spirit and scope of the following claims.

What is claimed is:

1. A camera module comprising: a housing having an opening; and
   a first lens assembly configured to move in the housing between a first position in which the first lens assembly is entirely in the housing, and a second position in which a portion of the first lens assembly protrudes outside the housing through the opening of the housing, the first lens assembly being attached to the housing by a magnetic force at the second position; and a second lens assembly provided in the housing, wherein a distance between the first lens assembly and the second lens assembly varies based on a movement of the first lens assembly,
   wherein the first lens assembly comprises at least one first lens and a first lens barrel supporting the at least one first lens, wherein the first lens barrel comprises an upper portion provided in the opening of the housing and a lower portion having a width that is greater than a width of the upper portion, and wherein the lower portion of the first lens barrel comprises a contact surface contacting an inner surface of the housing when the first lens assembly is at the second position.

2. The camera module of claim 1, further comprising a cover provided outside the housing and configured to move relative to the housing, wherein the cover is configured to: apply a pressing force to the first lens assembly to move the first lens assembly to the first position, and stop applying the pressing force to the first lens assembly to move the first lens assembly from the first position to the second position.

3. The camera module of claim 1, wherein the housing further comprises a first magnet on the inner surface of the housing, and wherein the first lens assembly further comprises a second magnet provided at the contact surface of the lower portion of the first lens barrel.

4. The camera module of claim 1, further comprising an elastic body configured to elastically support the first lens assembly in a direction from the first position towards the second position.

5. The camera module of claim 4, wherein the first lens assembly comprises at least one first lens and a first lens barrel supporting the at least one first lens, wherein the first lens barrel comprises an upper portion provided in the opening of the housing and a lower portion having a width that is greater than a width of the upper portion, and wherein the lower portion of the first lens barrel comprises a spring connection body supported by the elastic body.

6. The camera module of claim 5, wherein the elastic body comprises one of a compression spring and a tensile spring.

7. The camera module of claim 1, further comprising: a substrate on which the housing is mounted; and an image sensor provided on the substrate.

8. The camera module of claim 1, wherein the housing comprises a first magnet, and wherein the first lens assembly comprises a metal configured to attach to the first magnet by the magnetic force.

9. The camera module of claim 1, wherein the first lens assembly comprises a second magnet, and wherein the housing comprises a metal configured to attach to the second magnet by the magnetic force.

10. The camera module of claim 1, wherein the housing further comprises: an upper wall comprising the opening; a side wall connected to the upper wall; and a first magnet provided at the side wall, wherein the first lens assembly comprises a second magnet provided at a surface of the first lens assembly that faces the side wall of the housing, and wherein a distance between the surface of the first lens assembly and the side wall of the housing varies based on the first lens assembly moving between the first position and the second position.

11. The camera module of claim 10, further comprising a second lens assembly provided in the housing, wherein an optical axis of the first lens assembly and an optical axis of the second lens assembly are spaced apart from each other at the first position, and wherein the optical axis of the first lens assembly and the optical axis of the second lens assembly coincide with each other at the second position.

12. The camera module of claim 10, wherein the housing further comprises a guide rail extending obliquely in a first direction parallel to an optical axis of the first lens assembly and a second direction perpendicular to the optical axis of the first lens assembly, respectively, and wherein the first lens assembly is guided by the guide rail and moved between the first position and the second position.

* * * * *